United States Patent
Geng et al.

(10) Patent No.: US 12,452,831 B2
(45) Date of Patent: Oct. 21, 2025

(54) COMMUNICATION METHOD, COMMUNICATIONS APPARATUS, AND COMMUNICATIONS SYSTEM

(71) Applicant: HUAWEI TECHNOLOGIES CO., LTD., Guangdong (CN)

(72) Inventors: Tingting Geng, Shanghai (CN); Le Yan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 684 days.

(21) Appl. No.: 17/513,874

(22) Filed: Oct. 28, 2021

(65) Prior Publication Data

US 2022/0053452 A1 Feb. 17, 2022

Related U.S. Application Data

(63) Continuation of application No. PCT/CN2020/087348, filed on Apr. 28, 2020.

(30) Foreign Application Priority Data

Apr. 29, 2019 (CN) .......................... 201910355627.1

(51) Int. Cl.
*H04W 68/00* (2009.01)
(52) U.S. Cl.
CPC ................................ *H04W 68/005* (2013.01)
(58) Field of Classification Search
CPC . H04W 68/005; H04W 84/027; H04W 88/06; H04W 68/12; H04W 68/00; H04W 68/02; H04W 84/042; H04W 84/10
See application file for complete search history.

(56) References Cited

U.S. PATENT DOCUMENTS

| 7,382,767 B2 | 6/2008 | Stumer |
| 2003/0078047 A1 | 4/2003 | Lee et al. |
| (Continued) | | |

FOREIGN PATENT DOCUMENTS

| CN | 1238110 A | 12/1999 |
| CN | 1492628 A | 4/2004 |
| (Continued) | | |

OTHER PUBLICATIONS

3GPP TS 38.300 V15.5.0 (Mar. 2019), 3rd Generation Partnership Project; Technical Specification Group Radio Access Network; NR; NR and NG-RAN Overall Description; Stage 2(Release 15), 98 pages.

(Continued)

*Primary Examiner* — Christopher M Brandt

(57) ABSTRACT

This application provides a communication method and a corresponding apparatus and system. The method includes: receiving, in a first network, a paging message that is from a first network device and that is used to page a first terminal device, where the paging message includes first information, and a network type of the first network is a first network type; and determining, based on the first information, a second network associated with the paging message that is used to page the first terminal device, where a network type of the second network is a second network type. The first network type is a non-public network and the second network type is a public network, or the first network type is a public network and the second network type is a non-public network. Cross-network paging between networks of different network types can be supported.

16 Claims, 12 Drawing Sheets

(56) References Cited

U.S. PATENT DOCUMENTS

| | | | |
|---|---|---|---|
| 2004/0048610 A1 | | 3/2004 | Kim et al. |
| 2004/0157607 A1 | | 8/2004 | Kim et al. |
| 2011/0065430 A1 | * | 3/2011 | Jee .................. H04W 68/12 |
| | | | 455/426.1 |
| 2019/0394698 A1 | * | 12/2019 | Jeong ................ H04W 36/302 |

FOREIGN PATENT DOCUMENTS

| | | | | |
|---|---|---|---|---|
| CN | 1553667 | A | | 12/2004 |
| CN | 1571440 | A | | 1/2005 |
| CN | 101014139 | A | | 8/2007 |
| CN | 102833846 | A | | 12/2012 |
| CN | 103024871 | A | | 4/2013 |
| CN | 108235388 | A | | 6/2018 |
| JP | 2017526279 | A | | 9/2017 |
| WO | 1998009457 | A2 | | 3/1998 |
| WO | WO-9809457 | A2 | * | 3/1998 .............. H04W 4/24 |

OTHER PUBLICATIONS

3GPP TS 38.413 V15.3.0 (Mar. 2019), 3rd Generation Partnership Project; Technical Specification Group Radio Access Network; NG-RAN; NG Application Protocol (NGAP)(Release 15), 319 pages.

3GPP TS 38.423 V15.3.0 (Mar. 2019), 3rd Generation Partnership Project; Technical Specification Group Radio Access Network; NG-RAN; Xn application protocol (XnAP)(Release 15), 294 pages.

Intel, Nokia, Nokia Shanghai Bell, Update to Solution#3. 3GPP TSG SA WG2 Meeting #129, Oct. 15-19, 2018, Dongguan, China, S2-1811024, 5 pages.

Samsung, NTT Docomo, Huawei, Vivo, Update of Solution #4: Support of NPN subscription. SA WG2 Meeting #129Bis, Nov. 26-30, 2018, West palm Beach, USA, S2-1813179, 6 pages.

China Telecom, TP for NPN Paging. 3GPP TSG RAN WG3#106, Reno, Nevada, USA, Nov. 18-22, 2019, R3-196863, 5 pages.

* cited by examiner

COMMUNICATION METHOD, COMMUNICATIONS APPARATUS, AND COMMUNICATIONS SYSTEM

CROSS-REFERENCE TO RELATED APPLICATIONS

This application is a continuation of International Application No. PCT/CN2020/087348, filed on Apr. 28, 2020, which claims priority to Chinese Patent Application 201910355627.1, filed on Apr. 29, 2019. The disclosures of the aforementioned applications are hereby incorporated by reference in their entireties.

TECHNICAL FIELD

This application relates to the field of wireless communications, and more specifically, to a communication method, a communications apparatus, and a communications system.

BACKGROUND

A concept of a private network is proposed in development of communications. The private network is a concept relative to a public network, and may be understood as a private network, for example, an internal network established in a company, a school, or a factory. User equipment (user equipment, UE) not subscribed to the private network is not allowed to access the private network. The private network is also referred to as a non-public network (non-public network, NPN). Generally, a private network type may be identified by using a private network identifier (NPN identification, NPN ID). Different UEs support different NPN IDs. UE can camp on only an NPN corresponding to an NPN ID supported by the UE, and can initiate a service only in the NPN corresponding to the NPN ID that the UE is subscribed to.

The UE may support both the NPN and the public network (public network, PN, also referred to as a public network for short). When the UE moves in the private network and the public network, paging for the UE may involve two network types. Therefore, the paging for the UE in this scenario faces an urgent problem to be resolved.

SUMMARY

This application provides a communication method, a communications apparatus, and a communications system, to be applicable to power control or power headroom reporting in a multi-beam system.

According to a first aspect, a communication method is provided. The method includes:

A terminal device or an apparatus used in the terminal device receives a paging message from a first network device in a first network, where the paging message or control information of the paging message includes first information, and a network type of the first network is a first network type; and determines, based on the first information, a second network associated with the paging message that is used to page the terminal device, where a network type of the second network is a second network type.

The apparatus used in the terminal device may be a processor or a chip used in the terminal device.

Optionally, receiving the paging message from the first network device in the first network means that the terminal device camps on the first network.

The paging message is a paging message that is used to page the terminal device. The terminal device may be a first terminal device. There may be one or more first terminal devices.

The control information of the paging message is information used to indicate a resource of the paging message, for example, time-frequency resource information and/or a cycle of the paging message. The terminal device may correspondingly receive the paging message based on the control information of the paging message, learn of a location for receiving the paging message. Optionally, the control information of the paging message may be sent in a range of a cell. In other words, all terminal devices in the cell may receive the control information of the paging message.

Optionally, the first network type is a non-public network and the second network type is a public network, or the first network type is a public network and the second network type is a non-public network.

Optionally, the terminal device may be in an idle state or an inactive state.

In a first possible implementation of the first aspect, the first information includes indication information. The indication information is used to indicate a network type associated with the paging message, or the indication information is used to indicate a network identifier of the second network. That the indication information is used to indicate a network identifier of the second network may include: The indication information is used to indicate by using the network identifier of the second network, that is, directly indication; or the indication information is used to indicate by using an index or other information corresponding to the network identifier of the second network, that is, implicitly indication.

According to the first possible implementation of the first aspect, in a second possible implementation of the first aspect, the paging message further includes a terminal device identifier of the terminal device, and an identifier of the terminal device in the first network is the same as an identifier of the terminal device in the second network. The identifier of the terminal device in the first network and/or the identifier of the terminal device in the second network may be specific terminal device identifiers/a specific terminal device identifier (UE ID), for example, a C-RNTI, or an identifier used for paging, for example, a P-RNTI, provided that the two identifiers are identifiers with a same function. This is not limited herein.

In a third possible implementation of the first aspect, the first information includes an identifier of the terminal device in the second network, and the identifier of the terminal device in the second network is different from an identifier of the terminal device in the first network.

In a fourth possible implementation of the first aspect, the paging message is included in a paging message that is used to page one or more terminal devices. The one or more terminal devices include the first terminal device, and the paging message that is used to page the one or more terminal devices includes a first paging list and a second paging list. The first paging list is used to carry an identifier of the one or more terminal devices, and the first paging list is associated with the first network. The second paging list is used to carry an identifier of the one or more terminal devices, and the second paging list is associated with the second network. The first information is an identifier that is of the first terminal device and that is included in the second paging list.

The identifier of the one or more terminal devices is an identifier corresponding to the one or more terminal devices.

According to any one of the first aspect or the first to the fourth possible implementations of the first aspect, in a fifth possible implementation of the first aspect, the method further includes:

receiving second information from the first network;

determining, based on the second information, that the first network has a capability of supporting a service of the second network; and sending a response message for the paging message to the first network device by using the first network.

According to the fifth possible implementation of the first aspect, in a sixth possible implementation of the first aspect, the method further includes:

The response message includes third information, and the third information indicates that a network associated with the response message is the second network.

According to any one of the first aspect or the first to fourth possible implementations of the first aspect, in a seventh possible implementation of the first aspect, the method further includes:

performing cell reselection to reselect a cell in the second network; and sending a response message to a network device corresponding to the cell; where the first network does not have a capability of supporting a service of the second network.

According to the seventh possible implementation of the first aspect, in an eighth possible implementation of the first aspect, before the performing cell reselection, the method further includes:

sending fourth information to the first network device by using the first network, where the fourth information is used to request to change a serving cell.

According to any one of the first aspect or the first to eighth possible implementations of the first aspect, in a ninth possible implementation of the first aspect, the method further includes:

receiving, in the second network, a configuration from a second network device, where the configuration includes a mobile valid area; and determining a network to which the mobile valid area is applicable or a network type to which the mobile valid area is applicable.

According to the ninth possible implementation of the first aspect, in a tenth possible implementation of the first aspect, the configuration includes sixth information. The sixth information indicates the network type to which the mobile valid area is applicable, and the network type includes the first network type and the second network type, or the second network type. Alternatively, the sixth information indicates the network to which the mobile valid area is applicable, and the network includes the first network and the second network, or the second network. The network type of the second network is the second network type, and the network type of the first network is the first network type.

According to a second aspect, a communication method is provided. The method includes:

A first network device or an apparatus used in the first network device sends a second paging message to a terminal device in a first network. The second paging message or control information of the second paging message includes first information, and the first information is related to a network associated with the second paging message. The network associated with the second paging message is a second network. A network type of the first network is a first network type, and a network type of the second network is a second network type.

The first network type is a public network and the second network type is a non-public network, or the first network type is a non-public network and the second network type is a public network.

The second paging message may be used to page the terminal device. The terminal device may be a first terminal device. There may be one or more first terminal devices.

The apparatus used in the first network device may be a processor or a chip used in the first network device.

The first network device may be a network device to which a cell of the first network belongs. Optionally, the method further includes: The first network device or the apparatus used in the first network device generates the second paging message.

In a first possible implementation of the second aspect, that the first information is related to a network associated with the second paging message includes: The first information includes indication information, and the indication information is used to indicate a network identifier of the network associated with the second paging message; or the indication information is used to indicate a network type of the network associated with the second paging message, and the network type of the network associated with the paging message is the second network type.

According to the first possible implementation of the second aspect, in a second possible implementation of the second aspect, the second paging message further includes an identifier of the terminal device, and an identifier of the terminal device in the first network is the same as an identifier of the terminal device in the second network.

In a third possible implementation of the second aspect, that the first information is related to a network associated with the second paging message includes: The first information includes an identifier of the terminal device in the second network, and an identifier of the terminal device in the first network is different from the identifier of the terminal device in the second network.

In a fourth possible implementation of the second aspect, that the first information is related to a network associated with the second paging message includes: The second paging message is included in a paging message that is used to page one or more terminal devices. The one or more terminal devices include the first terminal device, and the paging message that is used to page the one or more terminal devices includes a first paging list and a second paging list. The first paging list is used to carry an identifier of the one or more terminal devices, and the first paging list is associated with the first network. The second paging list is used to carry an identifier of the one or more terminal devices, and the second paging list is associated with the second network. The first information is an identifier that is of the first terminal device and that is included in the second paging list.

According to any one of the second aspect or the first to the fourth possible implementations of the second aspect, in a fifth possible implementation of the second aspect, the method further includes:

The first network device or the apparatus used in the first network device sends second information to the terminal device, where the second information indicates that the first network has a capability of supporting a service of the second network; and receives a response message for the paging message by using the first network.

According to the fifth possible implementation of the second aspect, in a sixth possible implementation of the second aspect, the response message includes third information, and the third information indicates that a network associated with the response message is the second network.

According to any one of the second aspect or the first to the fourth possible implementations of the second aspect, in a seventh possible implementation of the second aspect, the method further includes:

The first network device or the apparatus used in the first network device receives fourth information from the terminal device. The fourth information is used to request to change a serving cell, and the first network does not have a capability of supporting a service of the second network.

According to any one of the second aspect or the first to the seventh possible implementations of the second aspect, in an eighth possible implementation of the second aspect, the method further includes:

The first network device or the apparatus used in the first network device receives a first paging message from a core network device or a second network device; and sends the second paging message to the terminal device based on the first paging message.

Optionally, when the terminal device is in an idle state, the first paging message is from the core network device.

Optionally, when the terminal device is in an inactive state, the first paging message is from the second network device. The second network device is a source serving network device of the terminal device, and the first network device is a current serving network device (also referred to as a target serving network device) of the terminal device.

Optionally, the method may further include:
determining that a network associated with the first paging message is the second network, or determining that a network type of a network associated with the first paging message is the second network type.

Sending the second paging message to the terminal device based on the first paging message includes:

sending the second paging message to the terminal device, where the identifier of the terminal device in the second paging message is the same as an identifier of the terminal device in the first paging message.

According to the eighth possible implementation of the second aspect, in a ninth possible implementation of the second aspect, the first paging message includes seventh information, and the seventh information is related to the second network associated with the first paging message.

Optionally, that the seventh information is related to the second network associated with the first paging message includes: The seventh information indicates the network associated with the first paging message, or the seventh information indicates the network type associated with the first paging message.

Optionally, the first paging message further includes the identifier of the terminal device, and the identifier of the terminal device in the first network is the same as the identifier of the terminal device in the second network.

Optionally, that the seventh information is related to the second network associated with the first paging message includes: The seventh information includes the identifier of the terminal device in the second network, and the identifier of the terminal device in the first network is different from the identifier of the terminal device in the second network.

Optionally, that the seventh information is related to the second network associated with the first paging message includes: The first paging message is included in a paging message that is used to page one or more terminal devices.

The one or more terminal devices include the first terminal device, and the paging message that is used to page the one or more terminal devices includes a first paging list and a second paging list. The first paging list is used to carry an identifier of the one or more terminal devices, and the first paging list is associated with the first network. The second paging list is used to carry an identifier of the one or more terminal devices, and the second paging list is associated with the second network. The seventh information is an identifier that is of the first terminal device and that is included in the second paging list.

Optionally, that the seventh information is related to the second network associated with the first paging message includes:

The seventh information indicates a network identifier of the network associated with the first paging message.

According to a third aspect, a communication method is provided. The method includes:

A core network device sends, to a first network device, a first paging message that is used to page a terminal device. The first network device is a network device to which a cell of a first network belongs, the first paging message includes seventh information, and the seventh information is related to a second network associated with the first paging message.

A network type of the second network is a second network type, a network type related to the first paging message is the second network type, and a network type of the first network is a first network type.

The first network type is a public network and the second network type is a non-public network, or the first network type is a non-public network and the second network type is a public network.

Alternatively, a second network device sends, to a first network device, a first paging message that is used to page a terminal device. The first network device is a network device to which a cell of a first network belongs, the first paging message includes seventh information, and the seventh information is related to a second network associated with the first paging message.

A network type of the second network is a second network type, a network type related to the first paging message is the second network type, and a network type of the first network is a first network type.

The first network type is a public network and the second network type is a non-public network, or the first network type is a non-public network and the second network type is a public network.

The terminal device may be a first terminal device. There may be one or more first terminal devices.

Optionally, the method further includes: The core network device or the second network device generates the first paging message.

Optionally, when the terminal device is in an idle state, the first paging message is from the core network device.

Optionally, when the terminal device is in an inactive state, the first paging message is from the second network device. The second network device is a source serving network device of the terminal device, and the first network device is a current serving network device (also referred to as a target serving network device) of the terminal device.

In a first possible implementation of the third aspect, that the seventh information is related to a second network associated with the first paging message includes: The seventh information indicates a network associated with the first paging message, or indicates a network type associated with the first paging message.

Optionally, the first paging message further includes an identifier of the terminal device, and an identifier of the terminal device in the first network is the same as an identifier of the terminal device in the second network.

In a second possible implementation of the third aspect, that the seventh information is related to a second network associated with the first paging message includes: The seventh information includes an identifier of the terminal device in the second network, and an identifier of the terminal device in the first network is different from the identifier of the terminal device in the second network.

In a third possible implementation of the third aspect, that the seventh information is related to a second network associated with the first paging message includes: The first paging message is included in a paging message that is used to page one or more terminal devices, and the paging message that is used to page the one or more terminal devices includes a first paging list and a second paging list. The first paging list is used to carry an identifier of the one or more terminal devices, and the first paging list is associated with the first network. The second paging list is used to carry an identifier of the one or more terminal devices, and the second paging list is associated with the second network. The seventh information is an identifier that is of the first terminal device and that is included in the second paging list.

According to the third aspect or the first possible implementation of the third aspect, in a fourth possible implementation of the third aspect, that the seventh information is related to a second network associated with the first paging message includes:

The seventh information indicates a network identifier of the network associated with the first paging message.

According to any one of the third aspect or the first to the fourth possible implementations of the third aspect, in a fifth possible implementation of the third aspect, the method further includes:

The core network device or the second network device sends, to the first network device or another network device, the first paging message that is used to page the terminal device. The first network device or the another network device is a network device to which a cell of the second network belongs.

According to a fourth aspect, a communication method is provided. The method includes:

A terminal device or an apparatus used in the terminal device receives a configuration from a second network device, where the configuration includes a mobile valid area; and
    determines a network to which the mobile valid area is applicable, or determines a network type to which the mobile valid area is applicable, where the network includes a first network and/or a second network, the network type of the first network is a first network type, the network type of the second network is a second network type, and the network type includes the first network type and/or the second network type.

Optionally, the terminal device or the apparatus used in the terminal device receives, in the second network, the configuration from the second network device. The network to which the mobile valid area is applicable includes the first network and the second network, or the second network. The network type to which the mobile valid area is applicable includes the first network type and the second network type, or the second network type.

Optionally, the terminal device camps on the second network, and the network type of the second network is the second network type.

Optionally, the mobile valid area includes a tracking area identity list (TAI list) and/or a radio access network notification area (RNA).

Optionally, when the terminal device is in an idle (idle) state, the mobile valid area includes the TAI list.

Optionally, when the terminal device is in an idle (idle) state, the configuration is further from a core network device.

Optionally, when the terminal device is in an inactive (inactive) state, the mobile valid area includes the RNA.

In a first possible implementation of the fourth aspect, the first network is used for reception of the configuration, and the mobile valid area is applicable to only the first network. Alternatively, the second network is used for reception of the configuration, and the mobile valid area is applicable to only the second network.

In a second possible implementation of the fourth aspect, the configuration includes sixth information, and the sixth information indicates the network or the network type to which the mobile valid area is applicable.

According to the fourth aspect or the first or second possible implementation of the fourth aspect, in a third possible implementation of the fourth aspect, the method further includes:
    when it is determined that a network type supported by a current serving cell is not included in the network type to which the mobile valid area is applicable or a network supported by a current serving cell is not included in the network to which the mobile valid area is applicable, initiating tracking area update TAU or radio access network notification area update RNAU to a first network device in which the current serving cell is located.

According to the fourth aspect or the first or the second possible implementation of the fourth aspect, in a fourth possible implementation of the fourth aspect, the first network type is a public network and the second network type is a private network, or the first network type is a private network and the second network type is a public network.

According to a fifth aspect, a communication method is provided. The method includes:

A core network device sends a configuration to a terminal device, where the configuration includes a mobile valid area.

The mobile valid area is applicable to only a network on which the terminal device currently camps or a network type corresponding to the network on which the terminal device currently camps.

Alternatively, the configuration includes sixth information. The sixth information indicates a network type to which the mobile valid area is applicable, and the network type includes a first network type and/or a second network type. Alternatively, the sixth information indicates a network to which the mobile valid area is applicable, and the network includes a first network and/or a second network. A network type of the first network is the first network type, and a network type of the second network is the second network type.

Optionally, the core network device sends the configuration to the terminal device in the second network. The network to which the mobile valid area is applicable includes the first network and the second network, or the second network. The network type to which the mobile valid area is applicable includes the first network type and the second network type, or the second network type.

Optionally, the network on which the terminal device currently camps is the second network, and the network type of the second network is the second network type.

Optionally, the method may further include: The core network device generates the configuration.

Optionally, the mobile valid area includes a tracking area identity list (TAI list), and the terminal device is in an idle (idle) state.

Optionally, the first network type is a public network and the second network type is a private network, or the first network type is a private network and the second network type is a public network.

According to a sixth aspect, a communication method is provided. The method includes:

A second network device sends a configuration to a terminal device, where the configuration includes a mobile valid area.

The mobile valid area is applicable to only a network on which the terminal device currently camps or a network type corresponding to the network on which the terminal device currently camps.

Alternatively, the configuration includes eighth information. The eighth information indicates a network type to which the mobile valid area is applicable, and the network type includes a first network type and/or a second network type. Alternatively, the eighth information indicates a network to which the mobile valid area is applicable, and the network includes a first network and/or a second network. A network type of the first network is the first network type, and a network type of the second network is the second network type.

Optionally, the second network device sends the configuration to the terminal device in the second network. The network to which the mobile valid area is applicable includes the first network and the second network, or the second network. The network type to which the mobile valid area is applicable includes the first network type and the second network type, or the second network type.

Optionally, the network on which the terminal device currently camps is the second network, and the network type of the second network is the second network type.

Optionally, the method may further include: The second network device generates the configuration.

Optionally, when the terminal device is in an idle (idle) state, the mobile valid area includes a TAI list.

Optionally, when the terminal device is in an idle (idle) state, the configuration is further from a core network device.

Optionally, when the terminal device is in an inactive (inactive) state, the mobile valid area includes the RNA.

According to a seventh aspect, an apparatus is provided. The apparatus provided in this application has a function of implementing an action of the network device or the terminal device in the aspects of the foregoing methods, and includes corresponding means (means) configured to implement the steps or the function described in the aspects of the foregoing methods. The steps or the function may be implemented by using software, hardware, or a combination of hardware and software.

In a possible design, the apparatus includes one or more processors, and may further include a communications unit. The one or more processors are configured to support the apparatus in performing the corresponding function of the network device in the foregoing methods. For example, a second paging message is generated. The communications unit is configured to support the apparatus in communicating with another device, to implement a receiving function and/or a sending function. For example, the second paging message is sent to the terminal device.

Optionally, the apparatus may further include one or more memories. The memory is coupled to the processor, and the memory stores a program instruction and/or data that are/is necessary for the network device. The one or more memories may be integrated with the processor, or may be disposed independent of the processor. This is not limited in this application.

The apparatus may be a base station, a gNB or TRP, a DU or CU, or the like. The communications unit may be a transceiver or a transceiver circuit. Optionally, the transceiver may alternatively be an input/output circuit or an interface.

The apparatus may alternatively be a chip, and the communications unit may be an input/output circuit or an interface of the chip.

In another possible design, the apparatus includes a transceiver, a processor, and a memory. The processor is configured to control the transceiver to receive/send a signal. The memory is configured to store a computer program. The processor is configured to run the computer program in the memory, so that the apparatus performs the method completed by the network device in any one of the second aspect, the third aspect, the sixth aspect, the possible implementations of the second aspect, the possible implementations of the third aspect, or the possible implementations of the sixth aspect.

In a possible design, the apparatus includes one or more processors, and may further include a communications unit. The one or more processors are configured to support the apparatus in performing the corresponding function of the terminal device in the foregoing methods. For example, a second network associated with the paging message that is used to page the terminal device is determined based on the first information. The communications unit is configured to support the apparatus in communicating with another device, to implement a receiving function and/or a sending function. For example, a paging message from a first network device is received.

Optionally, the apparatus may further include one or more memories. The memory is coupled to the processor, and the memory stores a program instruction and/or data that are/is necessary for the apparatus. The one or more memories may be integrated with the processor, or may be disposed independent of the processor. This is not limited in this application.

The apparatus may be a smart terminal, a wearable device, or the like. The communications unit may be a transceiver or a transceiver circuit. Optionally, the transceiver may alternatively be an input/output circuit or an interface.

The apparatus may alternatively be a chip, and the communications unit may be an input/output circuit or an interface of the chip.

In another possible design, the apparatus includes a transceiver, a processor, and a memory. The processor is configured to control the transceiver to receive/send a signal. The memory is configured to store a computer program. The processor is configured to run the computer program in the memory, so that the apparatus performs the method completed by the terminal device in any one of the first aspect, the fourth aspect, the possible implementations of the first aspect, or the possible implementations of the fourth aspect.

In a possible design, the apparatus includes one or more processors, and may further include a communications unit. The one or more processors are configured to support the apparatus in performing a function corresponding to the core network device in the foregoing methods. For example, a second paging message is generated. The communications unit is configured to support the apparatus in communicating with another device, to implement a receiving function and/or a sending function. For example, the second paging message is sent to the terminal device.

Optionally, the apparatus may further include one or more memories. The memory is coupled to the processor, and the memory stores a program instruction and/or data that are/is necessary for the network device. The one or more memories may be integrated with the processor, or may be disposed independent of the processor. This is not limited in this application.

The apparatus may be an AMF, an AMF and an SMF, or the like. The communications unit may be a transceiver or a transceiver circuit. Optionally, the transceiver may alternatively be an input/output circuit or an interface.

The apparatus may alternatively be a chip, and the communications unit may be an input/output circuit or an interface of the chip.

In another possible design, the apparatus includes a transceiver, a processor, and a memory. The processor is configured to control the transceiver to receive/send a signal. The memory is configured to store a computer program. The processor is configured to run the computer program in the memory, so that the apparatus performs the method completed by the core network device in any one of the third aspect, the fifth aspect, the possible implementations of the third aspect, or the possible implementations of the fifth aspect.

According to an eighth aspect, a system is provided. The system includes the foregoing network device and/or the foregoing core network device.

Optionally, the system further includes the foregoing terminal device.

According to a ninth aspect, a readable storage medium or program product is provided, and is configured to store a program or an instruction. The program or the instruction includes an instruction used to perform the method in any one of the first aspect to the sixth aspect or the possible implementations of the first aspect to the sixth aspect.

According to a tenth aspect, a readable storage medium or program product is provided, and is configured to store a program or an instruction. When the program or the instruction is run on a computer, the computer is enabled to perform the method in any one of the first aspect to the sixth aspect or the possible implementations of the first aspect to the sixth aspect.

According to the methods provided in the embodiments of this application, a cross-network paging method applicable to networks of different network types may be provided, so that the terminal device may learn of a network type associated with current paging, for example, learn that the network type associated with the current paging is a public network, to provide support in processing a service of the public network in a private network.

DESCRIPTION OF EMBODIMENTS

Figure 1:
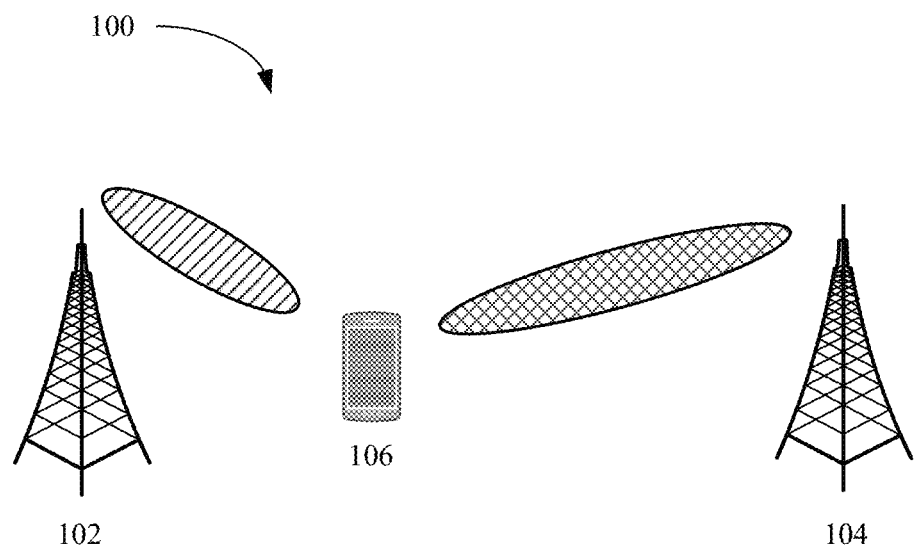
FIG. 1 is a diagram of a communications system applicable to a communication method according to an embodiment of this application.

The following describes technical solutions of this application with reference to accompanying drawings.

The technical solutions in the embodiments of this application may be applied to various communications systems such as a long term evolution (long term evolution, LTE) system, a worldwide interoperability for microwave access (worldwide interoperability for microwave access, WiMAX) communications system, a 5th generation (5th Generation, 5G) system, for example, a new radio (new radio access technology, NR) system, a network that integrates a plurality of systems, an internet of things system, an internet of vehicles system, and a future communications system, for example, a 6G system.

All aspects, embodiments, or features are presented in this application by describing a system that may include a plurality of devices, components, modules, and the like. It should be appreciated and understood that, each system may include another device, component, module, and the like, and/or may not include all devices, components, modules, and the like discussed with reference to the accompany drawings. In addition, a combination of these solutions may be used.

In addition, the word "example" in the embodiments of this application is used to represent giving an example, an illustration, or a description. Any embodiment or design scheme described as an "example" in this application should not be explained as being more preferred or having more advantages than another embodiment or design scheme. Exactly, "example" is used to present a concept in a specific manner.

In the embodiments of this application, "of (of)", "corresponding (corresponding, relevant)", and "corresponding (corresponding)" may be interchangeably used sometimes. It should be noted that meanings expressed by the terms are consistent when differences are not emphasized.

A network architecture and a service scenario described in the embodiments of this application are intended to describe the technical solutions in the embodiments of this application more clearly, and do not constitute a limitation on the technical solutions provided in the embodiments of this application. A person of ordinary skill in the art may learn that: With evolution of the network architecture and emergence of new service scenarios, the technical solutions provided in the embodiments of this application are also applicable to similar technical problems.

The embodiments of this application may be applied to a time division duplex (time division duplex, TDD) scenario, or may be applied to a frequency division duplex (frequency division duplex, FDD) scenario.

The embodiments of this application may be applied to a conventional typical network, or may be applied to a future UE-centric (UE-centric) network. A non-cell (Non-cell) network architecture is introduced to the UE-centric network. A large quantity of small cells are deployed in an area to form a hyper cell (Hyper cell), and each small cell is a transmission point (Transmission Point, TP) or a TRP of the hyper cell, and is connected to a centralized controller (controller). When UE moves in the hyper cell, a network side device selects a new sub-cluster (sub-cluster) for the UE in real time to serve the UE, to avoid a real cell handover, and implement UE service continuity. The network side device includes a wireless network device.

In the embodiments of this application, different base stations may be base stations that have different identifiers, or may be base stations that have a same identifier and that are deployed at different geographical locations. In some scenarios, before a base station is deployed, the base station does not know whether the base station is related to a scenario to which the embodiments of this application are applied. The base station or a baseband chip may support the methods provided in the embodiments of this application before being deployed. In some scenarios, the methods provided in the embodiments of this application may alternatively be supported through upgrade or loading after deployment. It may be understood that the foregoing base stations that have different identifiers may have base station identifiers, cell identifiers, or other identifiers.

In the embodiments of this application, an NR network scenario in a wireless communications network is used to describe some scenarios. It should be noted that the solutions in the embodiments of this application may further be applied to another wireless communications network, and a corresponding name may also be replaced with a name of a corresponding function in the another wireless communications network.

First, for ease of understanding the embodiments of this application, a communications system shown in FIG. 1 is used as an example to describe in detail a communications system to which the embodiments of this application are applicable. FIG. 1 is a diagram of a communications system applicable to a communication method according to an embodiment of this application. As shown in FIG. 1, the communications system 100 includes a network device 102 and a terminal device 106. A plurality of antennas may be configured for the network device 102, and a plurality of antennas may also be configured for the terminal device. Optionally, the communications system may further include a network device 104, and a plurality of antennas may also be configured for the network device 104.

It should be understood that the network device 102 or the network device 104 may further include a plurality of means (for example, a processor, a modulator, a multiplexer, a demodulator, or a demultiplexer) related to signal sending and receiving.

The network device is a device having a wireless transceiver function or a chip that may be disposed in the device. The device includes but is not limited to: an evolved NodeB (evolved Node B, eNB), a radio network controller (radio network controller, RNC), a NodeB (Node B, NB), a base station controller (base station controller, BSC), a base transceiver station (base transceiver station, BTS), a home base station (for example, a home evolved NodeB, or a home Node B, HNB), a baseband unit (baseband unit, BBU), an access point (access point, AP) in a wireless fidelity (wireless fidelity, WI-FI) system, a wireless relay node, a wireless backhaul node, a transmission point (transmission and reception point, TRP or transmission point, TP), or the like. The device may alternatively be a gNB or a transmission point (TRP or TP) in a 5G system, for example, an NR system, or one or one group (including a plurality of antenna panels) of antenna panels of a base station in a 5G system. The device may alternatively be a network node, for example, a baseband unit (BBU) or a distributed unit (DU, distributed unit), that constitutes a gNB or a transmission point.

In some deployments, the gNB may include a centralized unit (centralized unit, CU) and the DU. The gNB may further include a radio frequency unit (radio unit, RU). A plurality of DUs may be controlled by one CU in a centralized manner. The CU implements some functions of the gNB, and the DU implements some functions of the gNB. The CU and the DU may be divided based on protocol layers of a wireless network. For example, functions of a packet data convergence protocol (packet data convergence protocol, PDCP) layer and a protocol layer above the PDCP layer are set in the CU. Functions of protocol layers below the PDCP, such as a radio link control (radio link control, RLC) layer and a media access control (media access control, MAC) layer, are set in the DU. For another example, the CU implements functions of a radio resource control (radio resource control, RRC) layer and a packet data convergence protocol (packet data convergence protocol, PDCP) layer. The DU implements functions of a radio link control (radio link control, RLC) layer, a media access control (media access control, MAC) layer, and a physical (physical, PHY) layer. Information at the RRC layer eventually becomes information at the PHY layer, or is converted from information at the PHY layer. Therefore, in this architecture, higher layer signaling, for example, RRC layer signaling or PHCP layer signaling, may also be considered as being sent by the DU or sent by the DU and the RU. It may be understood that the network device may be a CU node, a DU node, or a device including a CU node and a DU node. In addition, the CU may be classified as a network device in an access network RAN, or the CU may be classified as a network device in a core network CN. This is not limited herein.

Alternatively, the CU may be divided into a control plane (CU-CP) and a user plane (CU-UP). The CU-CP is responsible for a control plane function, and mainly includes RRC and PDCP-C. The PDCP-C is mainly responsible for one or more of encryption and decryption, integrity protection, data transmission, and the like of control plane data. The CU-UP is responsible for a user plane function, and mainly includes an SDAP and a PDCP-U. The SDAP is mainly responsible for processing data of a core network and mapping a flow to a bearer. The PDCP-U is mainly responsible for encryption and decryption, integrity protection, header compression, serial number maintenance, data transmission, and the like of a data plane. The CU-CP and the CU-UP are connected through an interface (for example, an E1 interface). The CU-CP is connected to the core network through an interface (for example, an Ng interface), and is connected to the DU through an interface (for example, F1-C (control plane interface)). The CU-UP is connected to the DU through an interface (for example, F1-U (user plane interface)).

The terminal device may also be referred to as user equipment (user equipment, UE), an access terminal, a subscriber unit, a subscriber station, a mobile station, a mobile console, a remote station, a remote terminal, a mobile device, a user terminal, a terminal, a wireless communications device, a user agent, or a user apparatus. The terminal device in the embodiments of this application may be a mobile phone (mobile phone), a tablet computer (Pad), a computer having the wireless transceiver function, a virtual reality (virtual reality, VR) terminal device, an augmented reality (augmented reality, AR) terminal device, a wireless terminal in industrial control (industrial control), a wireless terminal in self-driving (self driving), a wireless terminal in telemedicine (remote medical), a wireless terminal in a smart grid (smart grid), a wireless terminal in transportation safety (transportation safety), a wireless terminal in a smart city (smart city), a wireless terminal in a smart home (smart home), or the like. An application scenario is not limited in the embodiments of this application. In this application, the methods and the steps that are implemented by the terminal device may also be implemented by a means (for example, a chip or a circuit) that may be used in the terminal device. In this application, the foregoing terminal device and the means (for example, the chip or the circuit) that may be disposed in the foregoing terminal device are collectively referred to as a terminal device.

In the communications system 100, the network device 102 and the network device 104 each may communicate with a plurality of terminal devices (for example, the terminal device 106 shown in the figure). The network device 102 and the network device 104 may communicate with any quantity of terminal devices similar to the terminal device 106. However, it should be understood that a terminal device communicating with the network device 102 and a terminal device communicating with the network device 104 may be the same or may be different. The terminal device 106 shown in FIG. 1 may communicate with both the network device 102 and the network device 104, but this shows only a possible scenario. In some scenarios, the terminal device may communicate with only the network device 102 or the network device 104. This is not limited in this application.

It should be understood that FIG. 1 is merely a simplified diagram used as an example for ease of understanding. The communications system may further include another network device or another terminal device that is not shown in FIG. 1.

A concept of a private network (also referred to as a non-public network) is proposed in development of communications. The private network is a concept relative to a public network, and may be understood as a private network, for example, an internal network established in a company, a school, or a factory. A terminal device not subscribed to the private network may be not allowed to access the private network. The public network in the embodiments of this application is a public network deployed by an operator. Generally, the public network may be a network providing a service for a terminal device subscribed to the operator. Whether a terminal device supporting the public network can access the public network providing a service may be determined by determining whether the terminal device is a subscribed terminal device of an operator supported by the public network. If the terminal device is the subscribed terminal device of the operator supported by the public network, the terminal device can camp on or access the public network. If the terminal device is not the subscribed terminal device of the operator supported by the public network, the terminal device cannot camp on or access the public network.

Currently, the private network may be deployed in one or more of the following manners:

Manner 1: The private network may be a cell configured with a private network-dedicated base station and/or a core network. A terminal device supporting the private network may camp on and initiate a service in the base station and/or the core network. The private network is generally referred to as a standalone (standalone, SA) NPN cell in the 3GPP protocol.

Manner 2: The private network may also be a slice (slice) of the public network, in other words, a slice in the public network may be configured as the private network. All terminal devices may camp on the network. After the terminal device enters a connected state and initiates a service request, the network specifies, based on slice information corresponding to a service, whether the service is a private network service, the service of the terminal device to a corresponding slice of the private network.

Manner 3: The private network may further be a cell deployed by an operator. In a possible implementation, only a terminal device in the private network is allowed to camp on or initially access the private network. In the 3GPP protocol, such a private network is generally referred to as a closed access group (closed access group, CAG) cell, or a non-standalone (non-standalone, NSA) NPN cell.

It may be understood that both Manner 2 and Manner 3 are NSA NPN deployment manners. Manner 2 and Manner 3 are both deployed by an operator, and therefore, an X2/Xn connection may be established between a base station supporting the private network and a base station of the operator, and/or a connection may be established between a core network of the private network and a core network of the public network, or a core network of the private network and a core network of the public network are same core networks. In this case, both the private network and public network are deployed by the operator. During network planning, a tracking area code (TAC, tracking area code) and/or a radio access network area code (RANAC, RAN area code) of a PN cell and the CAG cell may be the same. The TAC and the RANAC each can identify an area code to which a cell belongs. The TAC is generally a core network-level area code, and the TAC is a number of a tracking area (Tracking Area, TA) numbered by an operator. Each tracking area has a number. There are two types of numbers: the TAC and a tracking area identity (Tracking Area Identity, TAI). The TAI is a global number and includes a mobile country code (Mobile Country Code, MCC)+a mobile network code (Mobile Network Code, MNC)+the TAC. When a terminal device attaches (attach) for the first time, a core network device allocates a TAI list (TAI List) to the terminal device. When paging is performed, a call is made to a cell in the TAI List. The TAI list may further be used to track a location of the terminal device. When the terminal device leaves the cell in the TAI list, tracking area update (Tracking Area Update, TAU) may be performed, so that TAIs between a network end (including the core network device and/or a network device) and the terminal device are synchronized. The core network device may allocate the TAI list to a terminal device in an idle (idle) state, a terminal device in an inactive (inactive) state, or a terminal device in an active (active) state. The radio access network area code (RANAC) is an access network (RAN)-level area code. Generally, an area corresponding to the RANAC is less than or equal to an area corresponding to the TAC. A source access network device (also referred to as a source serving network device) may allocate a radio access network notification area (RAN Notification Area, RNA) to the terminal device in an inactive state. The source access network device may be an access network device that stores a context of the terminal device, and/or the source access network device may be an access network device configured to configure UE to enter the inactive state. An area corresponding to the RNA includes an area corresponding to at least one cell. Generally, an area range corresponding to the RNA is less than or equal to an area range corresponding to the TAI list. It may be understood that the TAI list or the RNA is a logical concept. A configuration of the RNA may include at least one of the following: (1) a cell list, including at least one cell identifier; and (2) a RAN area list, including at least one TAC or including at least one TAC and a RANAC.

Figure 2:
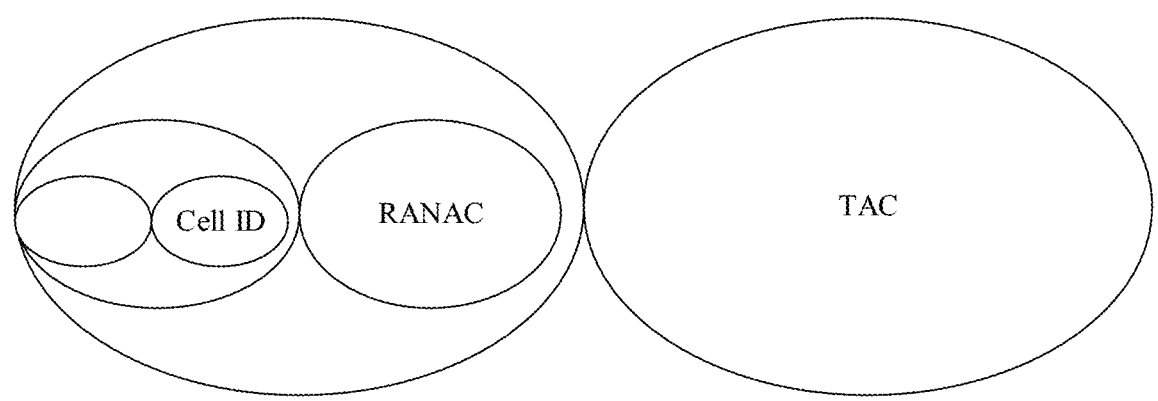
FIG. 2 a diagram of logical ranges of a TAC, a RANAC, and a cell ID.

FIG. 2 is a diagram of possible ranges of a TAC, a RANAC, and a cell ID.

When a private network and a public network coexist, a terminal device may support both the private network and the public network, for example, a terminal device subscribed to both the public network and the private network; or may support only the public network, for example, a terminal device subscribed to only the public network; or may support only the private network, for example, a terminal device subscribed to only the private network, for example, a smart terminal in a factory.

Figure 3:
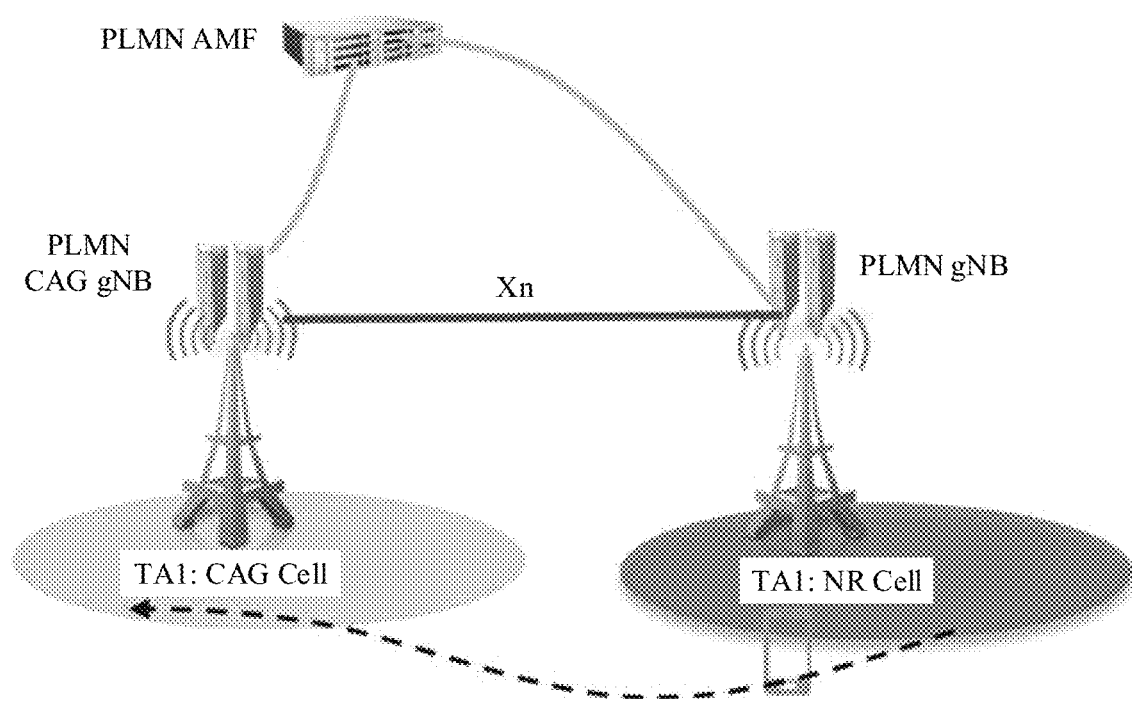
FIG. 3 is a diagram in which a terminal device moves between a private network and a public network.

When the terminal device supporting both the private network and the public network moves between the private network and the public network, in a current technology, cross-network paging for the terminal device between the private network and the public network is not supported, that is, cross-network paging for the terminal device between networks of different network types is not supported. An embodiment of this application provides a communication method, an apparatus, a chip, a storage medium, and a system, to support cross-network paging for a terminal device between networks of different network types. Herein, the networks of different network types may include a private network and a public network, or networks of other different network types. FIG. 3 is a diagram in which a terminal device moves between a private network and a public network. A PLMN AMF is an access and mobility management function (AMF, Access and Mobility Management Function) of a public land mobile network (public land mobile network, PLMN). A PLMN CAG gNB is a base station of a closed access group (closed access group, CAG) of the public land mobile network. A PLMN gNB is a base station of the public land mobile network. An NR cell is a new radio cell, and a CAG cell is a closed access group cell.

It may be understood that in the embodiments of this application, the terminal device and/or the network device may perform some or all steps in the embodiments of this application. These steps or the operations are merely examples. In the embodiments of this application, other operations or variations of various operations may further be performed. In addition, the steps may be performed in different sequences presented in the embodiments of this application, and not all the operations in the embodiments of this application may be performed.

An embodiment of this application provides a communication method, to support cross-network paging in networks of different network types. In this application, "uplink" may indicate that a terminal device is a transmit end, and a network device is a receive end, and "downlink" may indicate that a network device is a transmit end, and a terminal device is a receive end. When this application is applied to communication between the transmit end and the receive end, "uplink" may indicate a transmission direction, and "downlink" may indicate another transmission direction opposite to the uplink direction.

As described above, a core network device or an access network device (the access network device is also referred to as a network device) configures a mobile valid area for the terminal device. The mobile valid area may include the TAI list, the RNA, and/or other area configuration information, for example, newly defined area configuration information. In the prior art, only a public network exists. Therefore, the configured mobile valid area is not used to distinguish a network type, that is, the mobile valid area is irrelevant to the network type. In other words, the mobile valid area is valid for the public network by default.

A first aspect of this embodiment of this application provides a cross-network paging solution in the networks of different network types.

A second aspect of this embodiment of this application provides a solution for configuring the mobile valid area when the mobile valid area is related to the network type. Further, an action that is of the terminal device and that is generated when a position of the terminal device moves is further provided when the mobile valid area is related to the network type.

The first aspect and the second aspect may be implemented in combination, or may be implemented independently. This is not limited herein.

First aspect: Cross-network paging in networks of different network types.

The following first describes the cross-network paging solution in the networks of different network types. In this case, a paging process may be changed, so that the paging process can reflect the network type. Optionally, an existing configuration of the mobile valid area may not be changed. The mobile valid area is irrelevant to the network type, or the mobile valid area is related to the network type.

A paged terminal device may be a terminal device in an idle state, or may be a terminal device in an inactive state.

The solution in this embodiment of this application relates to the terminal device, the access network device (also referred to as the network device), and the core network device.

Figure 4:
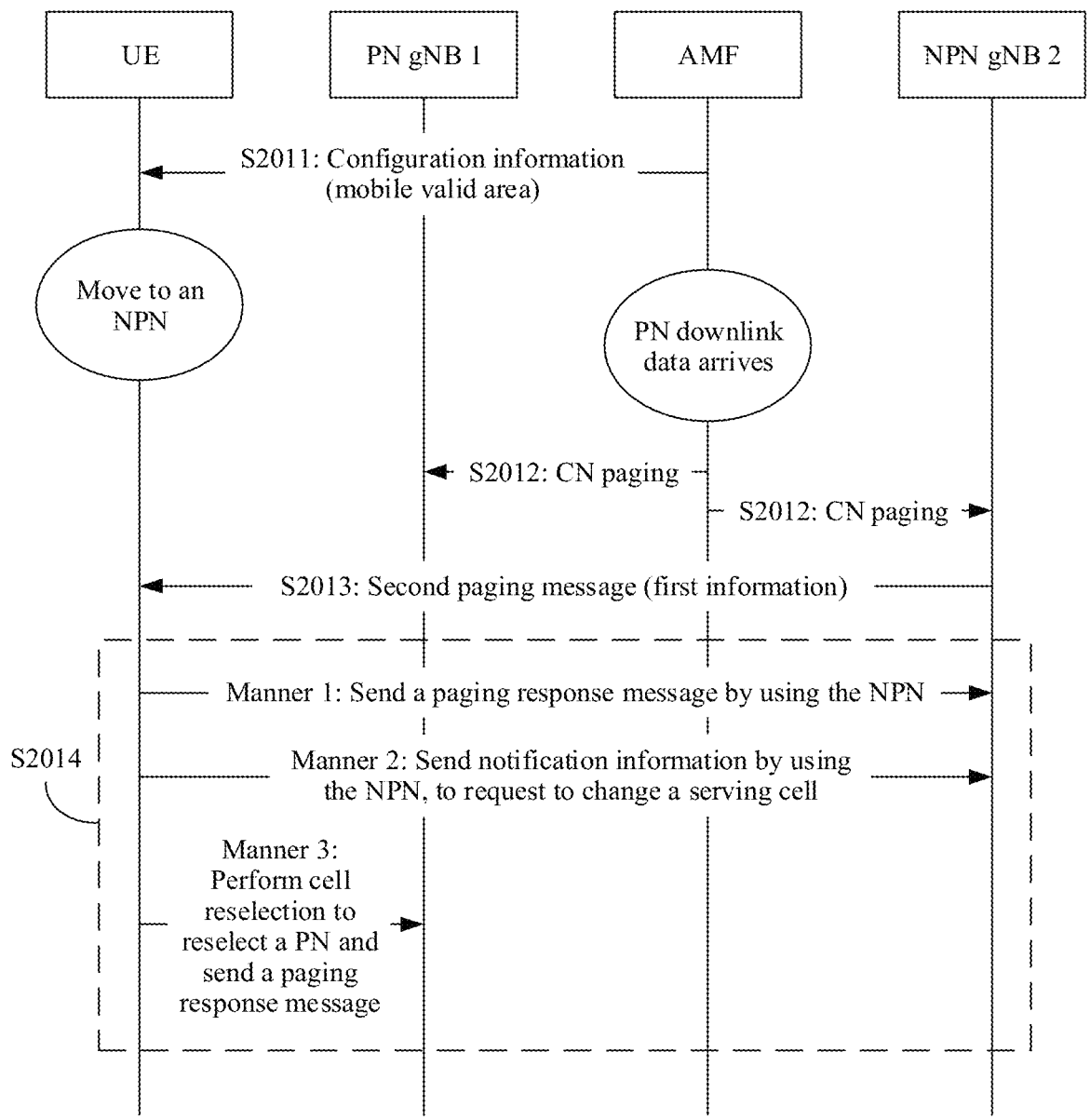
FIG. 4 is a flowchart of a solution according to an embodiment of this application.

FIG. 4 is a flowchart of a solution according to an embodiment of this application. In the flowchart, an example in which the terminal device is 5G UE in an idle state, the access network device is a 5G gNB, and the core network device is a 5G access and mobility management function (AMF, Access and Mobility Management Function), or an AMF and a session management function (SMF, Session management function) is used. For example, that the terminal device moves from a network of a second network type to a network of a first network type means that the terminal device moves from the public network to a private network. It may be understood that these examples do not limit an application scenario of the embodiments of this application. It may be understood that, in an implementation, the idle UE in this embodiment may refer to that the core network device considers that the UE is in the idle state. For example, if a state of the UE in the network of the first network type is inactive or active, but the state of the UE in the network of the second network type is idle, when a downlink service of the second network type arrives at the core network device, this embodiment may also be performed.

The solution 201 may include the following step.

S2012: When a downlink service of the terminal device arrives at the core network device, the core network device sends a first paging message (also referred to as core network paging (CN paging)) to network devices corresponding to a TAI list of the terminal device.

Optionally, the core network device sends, by using a first network, the first paging message to a first network device in the network devices corresponding to the TAI list of the terminal device.

Optionally, further, the core network device sends, by using a second network, the first paging message to a second network device in the network devices corresponding to the TAI list of the terminal device.

A network type of the first network is the first network type, and a network type of the second network is the second network type.

The first network type is a public network and the second network type is a non-public network, or the first network type is a non-public network and the second network type is a public network.

S2013: The first network device sends a second paging message to the terminal device.

Optionally, the terminal device currently camps on the first network, and a serving cell on which the terminal device currently camps belongs to the first network device. Optionally, the first network device sends the second paging message to the terminal device by using the first network, that is, sends the second paging message to the terminal device in the first network.

Optionally, the first paging message may include seventh information, and/or the second paging message may include first information, so that the network device determines, based on the seventh information included in the first paging message and/or the first information included in the second paging message, a network associated with the paging message or a network type associated with the paging message. For example, whether the paging message is from the public network or the private network (in other words, whether a service is provided by the public network or the private network), or whether the paging message is triggered by a public network service or a private network service.

It may be understood that there is a one-to-one correspondence or a many-to-one correspondence between the network and the network type. Because a network has a corresponding network type, the network associated with the paging message is determined. In other words, the network type associated with the paging message is implicitly determined. For the first network device and/or the terminal device, one network type may correspond to one or more networks in view of the first network device and/or the terminal device. Therefore, the network type associated with the paging message is determined. In other words, the one or more networks associated with the paging message are implicitly determined. Further, the first network device and/or the terminal device may determine, based on other information and/or a rule, a network associated with the paging message. For example, the terminal device may determine, based on the first network and/or the second network to which the terminal device is subscribed and the network type associated with the paging message, that the network associated with the paging message is the first network or the second network. For example, if the network type associated with the paging message is the first network type, and the network type of the first network is the first network type, the terminal device may determine that the network associated with the paging message is the first network. For another example, the first network device may determine, based on a network supported by the first network device, a network type corresponding to the network, and the network type associated with the paging message, the network associated with the paging message. In descriptions of this application, some descriptions are provided by using an example "determining the network type associated with the paging message". However, the "determining the network type associated with the paging message" may be replaced with "determining the network associated with the paging message". Optionally, the first paging message may include seventh information, and/or control information of the second paging message includes first information, so that the first network device determines, based on the seventh information included in the first paging message and/or the first information included in the control information of the second paging message, a network associated with the paging message, or a network type associated with the paging message. For example, whether the paging message is from the public network or the private network (in other words, whether a service is provided by the public network or the private network), or whether the paging message is triggered by a public network service or a private network service.

Optionally, the first information may be used by the terminal device to determine a network or a network type associated with a corresponding paging message, and/or the seventh information may be used by the first network device to determine a network or a network type associated with a corresponding paging message. For example, the paging message is from the public network or the private network (in other words, the service is provided by the public network or the private network), or the paging message is triggered by the public network service or the private network service. That the first information may be used by the terminal device to determine a network associated with the corresponding paging message may include: The first information may be used by the terminal device to determine network identifier information of the network type associated with the corresponding paging message. That the seventh information may be used by the first network device to determine a network associated with the corresponding paging message may include: The seventh information may be used by the first network device to determine network identifier information of the network type associated with the corresponding paging message. For example, the paging message is from the public network or is triggered by the public network service, and the first information may be public network identifier information, for example, a PLMN ID. Alternatively, the paging message is from the private network or is triggered by the private network service, and the first information may be private network identifier information, for example, an NPN ID or a CAG ID.

It may be understood that, in this application, the first paging message and/or the second paging message are/is used to page a specific terminal device, for example, a first terminal device. In one paging, the paging message may be used to page one or more first terminal devices. The seventh information and/or the first information are/is used to determine the network or the network type associated with the corresponding paging message, and is also described for the one or more first terminal devices. The seventh information and/or the first information may be set for each first terminal device in the paging message, or the first terminal devices in the paging message may be grouped. For example, the first terminal devices are classified into two groups based on network types of the paged first terminal devices, and the seventh information and/or the first information are/is set for each group of first terminal devices.

Optionally, a manner in which the first information and/or the seventh information indicate/indicates the network or the network type associated with the paging message (in other words, the first information and/or the seventh information are/is related to the network or the network type associated with the paging message) may be one of the following several manners. The manner in which the first information indicates the network or the network type associated with the paging message may be the same as or different from the manner in which the seventh information indicates the network or the network type associated with the paging message. That the first information and/or the seventh information indicate/indicates the network or the network type associated with the paging message may include one of the following: the first information indicates a network associated with the second paging message, the first information indicates a network type associated with the second paging message, the seventh information indicates a network associated with the first paging message, the seventh information indicates a network type associated with the first paging message, the first information indicates a network associated with the second paging message and the seventh information indicates a network type associated with the first paging message, the first information indicates a network associated with the second paging message and the seventh information indicates a network associated with the first paging message, the first information indicates a network type associated with the second paging message and the seventh information indicates a network type associated with the first paging message, or the first information indicates a network type associated with the second paging message and the seventh information indicates a network associated with the first paging message. Generally, the network type that is associated with the paging message and that is indicated by the first information is the same as the network type that is associated with the paging message and that is indicated by the seventh information. Optionally, the network that is associated with the paging message and that is indicated by the seventh information may include the network that is associated with the paging message and that is indicated by the first information.

In an optional manner, the first information and/or the seventh information may include indication information, and the indication information is used to indicate the network or the network type associated with the paging message, for example, the first network or the second network. The network type of the first network is the first network type and the network type of the second network is the second network type. For example, the first network type is a private network and the second network type is a public network. Optionally, that the indication information is used to indicate the network or the network type associated with the paging message may include: the indication information may be used to indicate network identifier information of the network associated with the paging message. The identifier information of the network type may include the public network identifier information or the private network identifier information. Optionally, the first paging message and/or the second paging message may further include a terminal device identifier. The terminal device identifier may be irrelevant to the network type. A terminal device identifier (briefly referred to as a terminal device identifier of the first network type) of the paged terminal device served by the network of the first network type (in other words, in the first network having the first network type) is the same as a terminal device identifier (briefly referred to as a terminal device identifier of the second network type) of the paged terminal device served by the network of the second network type (in other words, in the second network having the second network type), that is, the terminal device identifier is used in both the first network and the second network. Further, optionally, the indication information may be configured for the terminal device identifier. For example, the indication information is used as next-level configuration information of the terminal device identifier. The paged terminal device may determine, based on the indication information, whether the paging is from the network of the first network type or the network of the second network type. The terminal device identifier may be a specific terminal device identifier (UE ID), for example, a terminal device identifier allocated by a network side device to the terminal device, for example, an identifier used to page the terminal device. The terminal device identifier may alternatively be another identifier. This is not limited herein. For example, the indication information may be a field including one or more bits, and the field one-to-one corresponds to the network type. When the field is set to a first value, it indicates that the network type associated with the paging message is the first network type. When the field is set to a second value, it indicates that the network type associated with the paging message is the second network type. Alternatively, the field one-to-one corresponds to the network. When the field is a first value, it indicates that the network associated with the paging message is the first network. When the field is a second value, it indicates that the network associated with the paging message is the second network. Further, the terminal device may determine the network type of the first network and/or the network type of the second network based on a correspondence between the first network and the network type and/or a correspondence between the second network and the network type. When the field one-to-one corresponds to the network type, because the network type in this embodiment of this application includes the first network type and the second network type, the field may include one bit, to reduce signaling overheads. When the field one-to-one corresponds to the network, the field may be a network identifier of the network, or an index of the network. A correspondence between the network index and the network (for example, the network identifier) may be preset in at least one of the terminal device, the network device, or the core network device based on a standard protocol, or may be notified by using signaling between at least two of the terminal device, the network device, or the core network device. The terminal device learns of, by using the field, a network associated with the paging message, so that the terminal device can preferentially select the network and access the network when performing cell reselection, to improve communication performance.

In another optional manner, the first information and/or the seventh information may include a terminal device identifier of the first network type and/or a terminal device identifier of the second network type. That is, the terminal device identifier is related to the network type. For example, a terminal device identifier of the first network type of the terminal device is different from a terminal device identifier of the second network type of the terminal device. In this case, the paged terminal device may determine, based on the terminal device identifier, whether the paging is from the network of the first network type or the network of the second network type.

In still another optional manner, the first paging message may be included in a paging message 1 that is used to page one or more terminal devices, and the paging message 1 that is used to page the one or more terminal devices may include a first paging list and a second paging list. The second paging message may be included in a paging message 2 that is used to page the one or more terminal devices, and the paging message 2 that is used to page the one or more terminal devices may include the first paging list and the second paging list. The first paging list is used to carry an identifier of the one or more terminal devices, and the second paging list is used to carry an identifier of the one or more terminal devices. The first paging list is related to the first network (or the first network type), and the second paging list is related to the second network (or the second network type). The seventh information included in the first paging message and/or the first information included in the second paging message are/is a paging list in which the terminal device identifier is located. In other words, the paged terminal device determines, based on whether the terminal device identifier of the paged terminal device belongs to a first terminal device identifier set or a second terminal device identifier set, whether the paging is from the first network or the second network or whether the paging is from the network of the first network type or the network of the second network type. The first paging list and the second paging list may be distinguished by using different locations of the first paging list and the second paging list in the message, or by using explicit identifiers, or by using another manner. This is not limited herein.

Optionally, the first network device sends the second paging message, and the terminal device may determine, by detecting the terminal device identifier in the second paging message, whether the terminal device is paged.

S2014: The terminal device sends a paging response message for the second paging message to the first network device.

An example in which the terminal device in an idle state receives the TAI list in the public network and moves to the private network is used. If the terminal device is in the private network and receives the second paging message, the terminal device determines, based on the second paging message or the first information in the control information of the second paging message, that the paging message is triggered by the public network service. In this case, the terminal device may perform paging response in one of the following three manners. Optionally, the terminal device may determine the paging response manner by using second information from the private network. The second information may indicate whether the private network supports the public network service, or the second information may indicate a manner in which the private network supports the public network service. For example, the private network directly supports the public network service, or the private network supports the public network service by using a non-3GPP interworking function (Non-3GPP Interworking Function, N3IWF). That the private network directly supports the public network service may be as follows: In the private network, the public network service is transmitted to a data network (data network, DN) of the public network by using the private network. That the private network supports the public network service by using an N3IWF may be as follows: When the public network service is transmitted by using the private network, the public network service is transmitted to the N3IWF of the public network by using a user plane of the private network, and is transmitted to the data network of the public network by using the N3IWF of the public network. Alternatively, when the terminal device does not receive any indication information sent by the private network, the terminal device considers by default that the private network does not support the public network service, and then the terminal device actively reselects the public network.

Manner 1 (Opt A): The terminal device responds to the second paging message in the private network.

In this case, the private network on which the terminal device currently camps supports the public network service. Optionally, the terminal device may determine, based on the second information from the private network, that the private network supports the public network service, and/or the second information may indicate the manner in which the private network supports the public network service. For example, the private network directly supports the public network service, or the private network supports the public network service by using the N3IWF. Optionally, the second information may be carried in system information. The terminal device may respond to the second paging message in the private network. Optionally, the paging response message may include indication information, the indication information may indicate a network associated with the paging response message, and a network type of the network is a public network. Alternatively, the indication information may indicate that a network type associated with the paging response message is a public network. For example, the indication information may be carried in a message 5 (msg5). The msg5 may be a radio resource control setup complete (RRC setup complete) message, or a radio resource control resume complete (RRC resume complete) message. In this way, the first network device may determine, based on a network type of a service of the paged terminal device, a transmission priority of processing the accessed service, such as, to properly ensure that the private network service is preferentially processed.

Manner 2 (Opt B): The terminal device may send notification information to the first network device, and the notification information is used to notify the first network device and/or the core network device that the terminal device receives the paging message.

Optionally, the terminal device may receive fifth information from the private network, and determine that the private network does not support the public network service. Optionally, the fifth information may be carried in system information. Optionally, the fifth information and the second information may be indicated by using a same information element, or may be indicated by using different information elements. The terminal device may send the notification information to the first network device, and the notification information is used to notify the first network device that the terminal device receives the paging message, and/or the notification information is used to notify the first network device that the terminal device needs to change to a cell in the public network before access. Correspondingly, the first network device may also send the notification information to the core network device, so that the core network device learns that the paging succeeds. The terminal device may perform cell reselection to reselect the cell in the public network. When the terminal device receives paging from the public network in the private network, the terminal device triggers cell reselection. The cell reselection may not consider a reselection trigger condition that channel quality of a serving cell is lower than a threshold, but use the paging that is from the public network and that is received in the private network as the trigger condition. If the terminal device successfully reselects the cell of the public network, the terminal device may access the cell in the public network, and send the paging response message by using the public network. Further, a service is transmitted by using the public network.

Manner 3 (Opt C): The terminal device directly reselects the public network and then sends the paging response message.

Optionally, the terminal device may receive fifth information from the private network, and determine that the private network does not support the public network service. Optionally, the fifth information may be carried in system information. Optionally, the fifth information and the second information may be indicated by using a same information element, or may be indicated by using different information elements. After receiving a paging message from the public network, the terminal device may perform cell reselection. For a specific cell reselection procedure and a specific procedure in which the terminal device accesses the cell in the public network and sends the paging response message, refer to the descriptions in Opt B. In this manner, the terminal device does not perform any action in a cell in the private network, for example, does not send the notification information in Opt B.

It may be understood that Manner 1 to Manner 3 may be agreed based on a protocol, and the terminal device always uses Manner 2 or Manner 3. In this case, the terminal device does not need to learn whether a network of one network type supports a service of a network of another network type, and does not need to perform determining either. Optionally, based on a protocol agreement, the terminal device may determine, based on whether a network of one network type supports a service of a network of another network type, to use Manner 1 or Manner 2, or to use Manner 1 or Manner 3. For example, when the terminal device determines to use Manner 1 when the current network supports the service of the network of the another network type. Further, when the terminal device determines to use Manner 2 or Manner 3 when the current network does not support the service of the network of the another network type. Whether Manner 2 or Manner 3 is used may be determined based on a protocol agreement, or may be determined based on another condition. For example, whether Manner 2 or Manner 3 is used is determined based on an indication of the first network device. Optionally, the indication may be an explicit indication or an implicit indication. Optionally, the indication may be carried in the second paging message and/or the first paging message, or may be carried in another message. This is not limited in this application.

Optionally, the solution 201 may further include the following step.

S2011: The second network device sends configuration information to the terminal device, to indicate the terminal device to enter an idle state and a mobile valid area in which the terminal device is in the idle state, for example, a TAI list.

Optionally, the second network device sends the configuration information to the terminal device in the second network.

Optionally, the second network device sends indication information to the terminal device, where the indication information is used to determine a network or a network type to which the mobile valid area of the terminal device is applicable. For example, the indication information may indicate that the network to which the mobile valid area is applicable is the first network, the second network, or the first network and the second network. The network type of the first network is the first network type, and the network type of the second network is the second network type. Alternatively, the indication information may indicate that the network type to which the mobile valid area is applicable is the first network type, the second network type, or the first network type and the second network type. For example, if the terminal device is in the network of the second network type, for example, the public network, the terminal device receives the mobile valid area, for example, the TAI list. The terminal device receives indication information from the public network, and the terminal device determines, based on the indication information, that the TAI list is applicable to the public network and the private network. When the terminal device moves to a cell of the network, for example, the private network, of the first network type that is the same as a TAI in the TAI list, the terminal device does not initiate a tracking area update (TAU) procedure. Optionally, the indication information may be included in the configuration information.

Optionally, the mobile valid area may be applicable to, by default, only a network or a network type used by a serving cell that receives the mobile valid area. For example, if the terminal device receives the mobile valid area, for example, the TAI list, in the network of the second network type, for example, the public network, the terminal device considers that the TAI list is applicable to only the public network. When the terminal device moves to a cell of the network, for example, the private network, of the first network type that is the same as the TAI in the TAI list, the terminal device initiates the tracking area update (TAU) procedure.

The foregoing manner of determining the network or the network type to which the mobile valid area is applicable by default, or a manner of indicating, by using the indication information, the network or the network type to which the mobile valid area is applicable may be collectively referred to as the mobile valid area is related to the network type. For a specific configuration in which the mobile valid area is related to the network type, and an action of the terminal device, refer to subsequent descriptions in the second aspect. Details are not described herein.

Optionally, in this procedure, the mobile valid area is irrelevant to the network type, or the mobile valid area is valid for different network types. Therefore, if the terminal device receives the mobile valid area, for example, the TAI list, in the network of the second network type, for example, the public network, and moves to the cell of the network, for example, the private network, of the first network type that is the same as the TAI in the TAI list, the terminal device does not initiate the tracking area update (TAU) procedure.

It may be understood that the foregoing embodiment is described by using an example in which a network architecture includes the access network device and the core network device. The foregoing embodiment may further be extended to a network architecture including only the access network device. Correspondingly, a variant procedure of the embodiment needs to be performed. For example, an interaction procedure between the network device and the core network device is not performed, or the network device may perform functions of the network device and the core network device.

It may be understood that the foregoing scenario may further be applicable to a procedure in which a CU sends a paging message to a DU when the network device includes the CU and the DU. For example, the second paging message in S2013 further includes the first information related to the network or the network type, and this may also be applied to the paging message sent by the CU to the DU. For example, the paging message sent by the CU to the DU includes the first information related to the network or the network type. The foregoing embodiment is applied to a scenario in which the network device includes the CU and the DU, as shown in FIG. 5.

Figure 5:
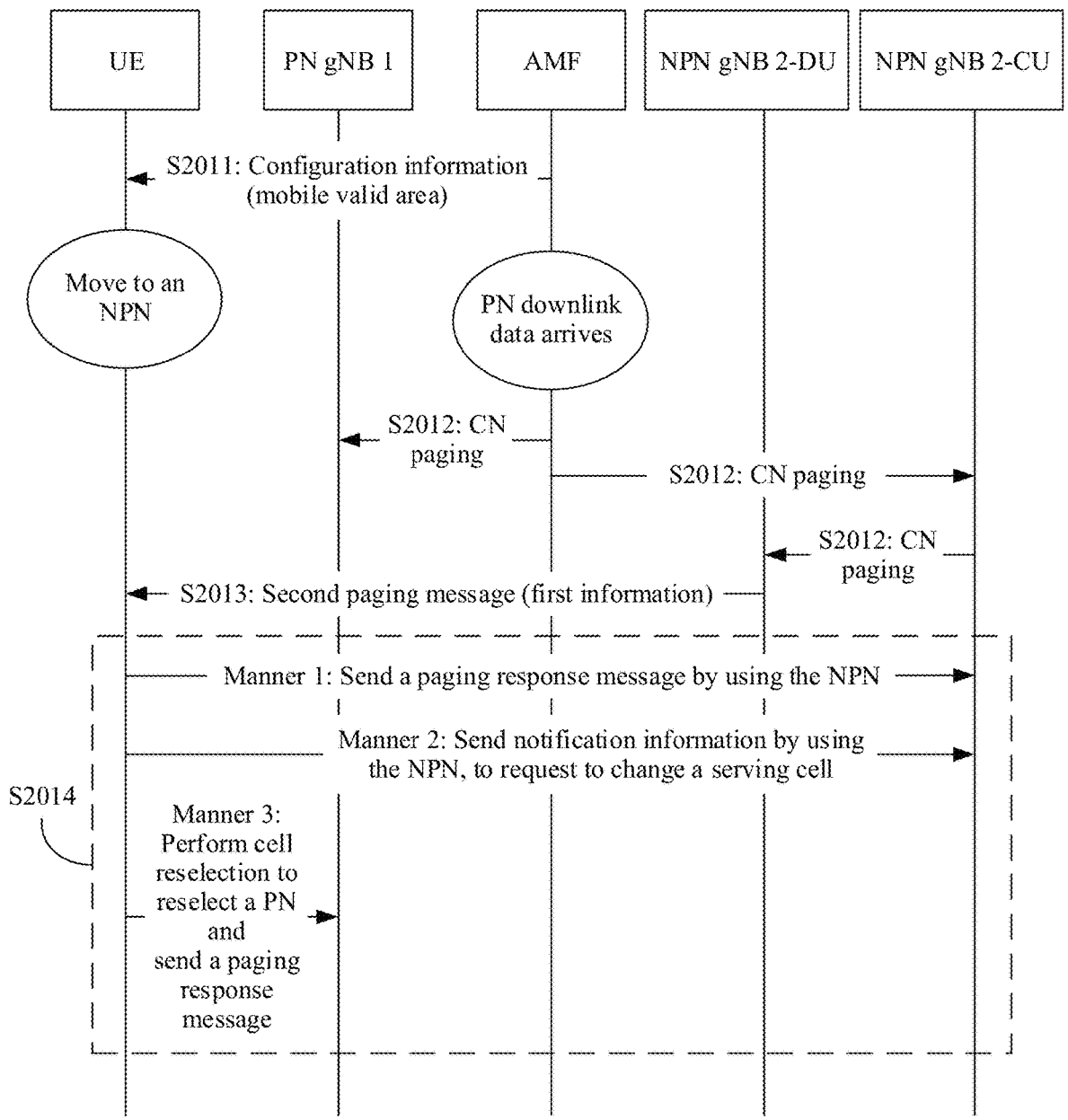
FIG. 5 is a flowchart of a solution generated when a network device has a CU-DU architecture according to an embodiment of this application.
Figure 6:
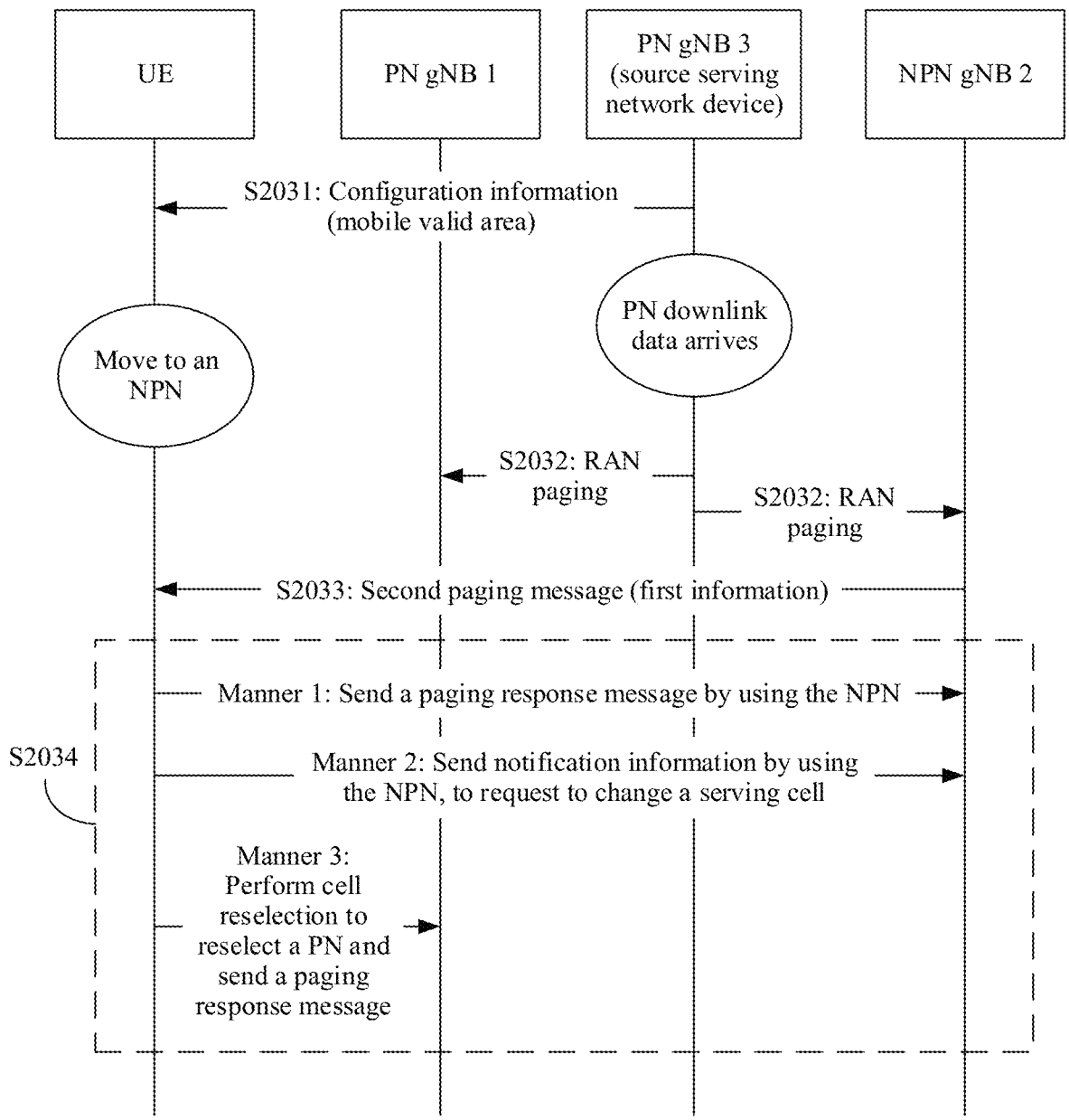
FIG. 6 is a flowchart of a solution according to an embodiment of this application.

In the foregoing procedure shown in FIG. 4 or FIG. 5, the terminal device in an idle state is used as an example. Optionally, the foregoing described part may also be applied to the terminal device in an inactive state. FIG. 6 is a flowchart when an embodiment of this application is applied to the terminal device in an inactive state.

The solution 203 may include the following step.

S2032: When a downlink service of the terminal device arrives at a source serving network device (for example, a PN gNB 3), the source serving network device sends a first paging message (also referred to as radio access network paging (RAN paging)) to a network device (excluding the source serving network device) corresponding to an RNA of the terminal device.

The RAN paging may carry first information, so that the terminal device determines, based on the first information, a network or a network type associated with the paging. A specific manner of the first information is the same as a specific manner of the first information included in the first paging message in S2012 or the second paging message in S2013, and details are not described herein again.

Optionally, the source serving network device may send the first paging message to one or more second network devices such as a PN gNB 1 in network devices corresponding to the RNA of the terminal device. The one or more second network devices each are a network device to which a cell of a second network belongs, and the network type of the second network is a second network type. Optionally, the source serving network device is one of the second network devices. However, because the first paging message is sent by the source serving network device, the one or more second network devices that receive the first paging message do not include the source serving network device. However, for ease of description, in this embodiment of this application, the source serving network device may also be referred to as a second network device.

Optionally, further, the source serving network device may send the first paging message to one or more first network devices such as an NPN gNB 2 in the network devices corresponding to the RNA of the terminal device. The one or more first network devices each are a network device to which a cell of a first network belongs, and a network type of the first network is a first network type. In other words, the source serving network device sends the first paging message in both the first network and the second network.

S2033: After receiving the radio access network paging from the source serving network device, a current serving network device (for example, the NPN gNB 2) of the terminal device sends a second paging message.

Optionally, the current serving network device (which is one of the one or more first network devices) of the terminal device sends the second paging message by using the second network.

S2034: The terminal device sends a paging response message for the second paging message to the current serving network device.

Optionally, the terminal device sends the paging response message for the second paging message to the first network device by using the second network.

A specific manner of S2033 is similar to that of S2013. For details, refer to the description of S2013. A specific manner of S2034 is similar to that of S2014. For details, refer to the description of S2014. A difference between S2033 and/or S2034 and S2013 and/or S2014 lies in that the second paging message sent by the current serving network device in the solution 203 is triggered by the first paging message sent by the source serving network device, but the second paging message sent by the network device in the solution 201 is triggered by the first paging message sent by the core network device. Therefore, in S2034 in the solution 203, if the terminal device performs the paging response manner of Opt B, in other words, the terminal device sends the notification information to the current serving network device, the current serving network device further notifies the source serving network device. In a possible manner, that the current serving network device further notifies the source serving network device may include: initiating a context obtaining procedure of the terminal device to the source serving network device. Optionally, after obtaining a context of the terminal device, the current serving network device may initiate path switching (path switch) to notify the core network device, so that a connection between the access network and the core network of the terminal device is updated to a connection between the current serving network device and the core network device. If the current serving network device does not obtain the context of the terminal device, the connection between the access network and the core network of the terminal device is still a connection between the source serving network device and the core network device.

Further, optionally, the solution 203 may further include the following step.

S2031: The source serving network device sends configuration information to the terminal device, to indicate the terminal device to enter an inactive state and indicate a mobile valid area when the terminal device is in the inactive state, for example, an RNA.

Optionally, the source network device sends indication information to the terminal device, and the indication information is used by the terminal device to determine a network or a network type to which the mobile valid area is applicable.

For a solution in which the mobile valid area is related to a network having a corresponding network type or a network type, refer to subsequent descriptions in the second aspect. Details are not described herein.

Figure 7:
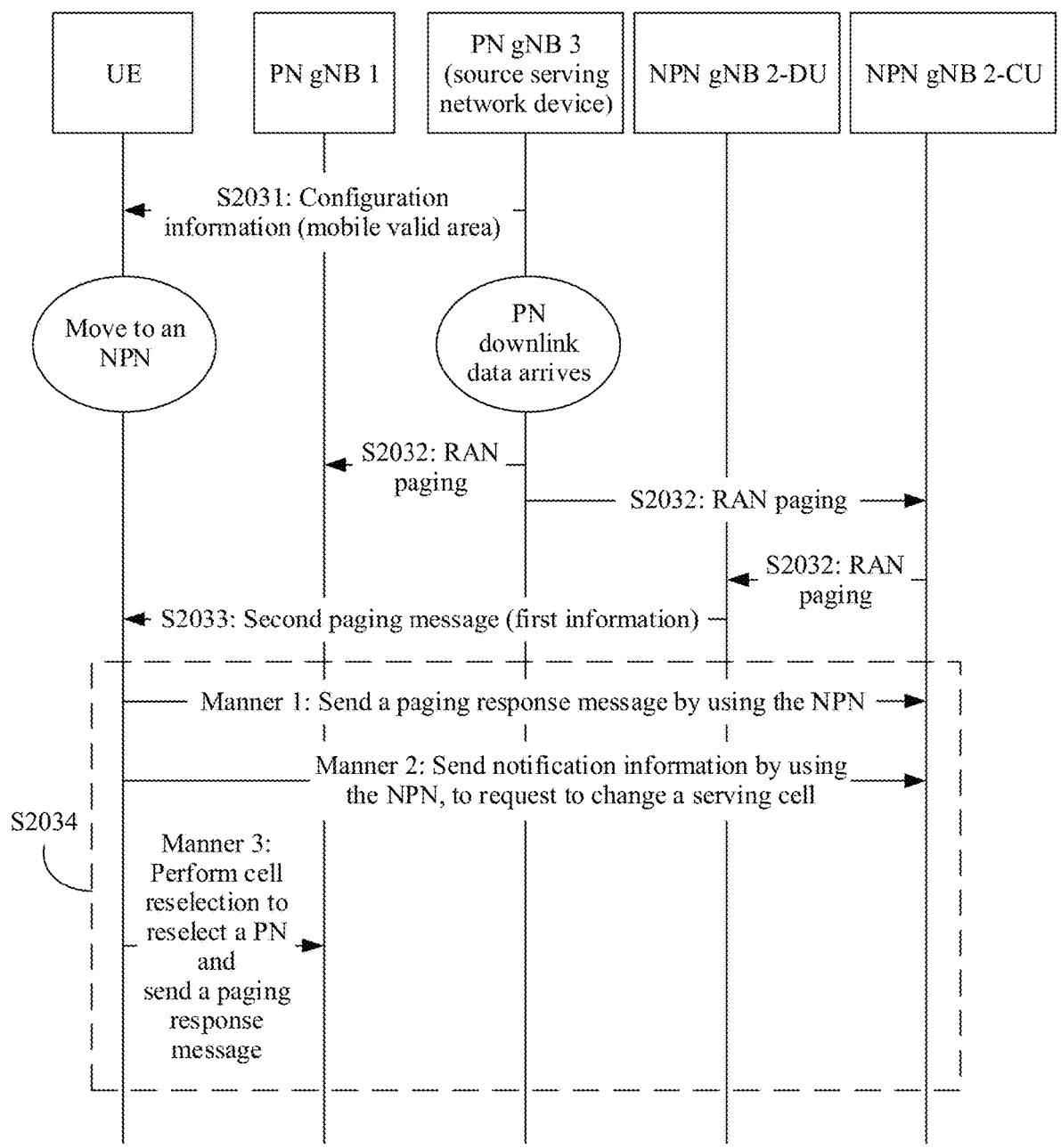
FIG. 7 is a flowchart of a solution generated when a network device has a CU-DU architecture according to an embodiment of this application.

Correspondingly, the description in solution 203 is also applicable to a procedure in which a CU sends a paging message to a DU when the network device includes the CU and the DU. For example, the second paging message in S2033 includes the first information related to the network or the network type, and this is also applicable to the paging message sent by the CU to the DU. For example, the paging message sent by the CU to the DU includes the first information related to the network or the network type. The foregoing embodiment is applied to a scenario in which the network device includes the CU and the DU, as shown in FIG. 7.

Each of solutions 201 to 204 in this embodiment of this application can support cross-network paging between networks of different network types. Further, each of the solutions 201 to 204 may enable the network device to determine a trigger reason of the paging message, namely, the network or the network type associated with the paging message, so as to properly adjust a sending priority of the paging message. For example, in an existing network, one paging message may carry a maximum of 32 terminal device identifiers. If a public network device receives paging of a plurality of terminal devices, there may be 32 paging triggered by a public network service on a same paging occasion (paging occasion, PO). In other words, 32 public network terminal devices need to be paged. There are three paging triggered by a private network service, and a quantity of terminal devices that can be paged in one PO is exceeded. The public network device may preferentially page terminal devices in the public network on the PO in a paging cycle, and then page terminal devices in the private network in a next paging cycle. In addition, each of the solutions 201 to 204 may further enable the terminal device to determine a more proper paging response mechanism based on whether the current network supports the service of the network of the another network type.

Second aspect: Configuration of the mobile valid area when the mobile valid area is related to a network having a corresponding network type or a network type.

The following describes the configuration of the mobile valid area when the mobile valid area is related to the network type. In this case, optionally, a paging process may further be modified, so that the paging process may be related to the network having the corresponding network type or the network type, and cross-network paging in networks of different network types is supported. For a specific paging process, refer to corresponding descriptions in the foregoing FIG. 4 to FIG. 7. Optionally, the paging process may not support the cross-network paging in networks of different network types. In this case, because the mobile valid area is related to the network type, paging processing performed by the network device and the terminal device may be consistent, to avoid an unknown failure.

A paged terminal device may be a terminal device in an idle state, or may be a terminal device in an inactive state.

The following first describes the solution of configuring the mobile valid area when the mobile valid area is related to the network or the network type. It may be understood that, for a terminal device that supports only the public network service, because the terminal device cannot camp on a cell in the private network, after receiving the mobile valid area sent by the network device, the terminal device considers by default that the mobile valid area is applicable to only the public network. Correspondingly, the mobile valid area received by a terminal device that supports only the private network service by default is applicable to only the private network. For a correspondence between the mobile valid area and the network type of a terminal device that supports both the private network service and the public network service, refer to related descriptions in this embodiment of this application.

Figure 8:
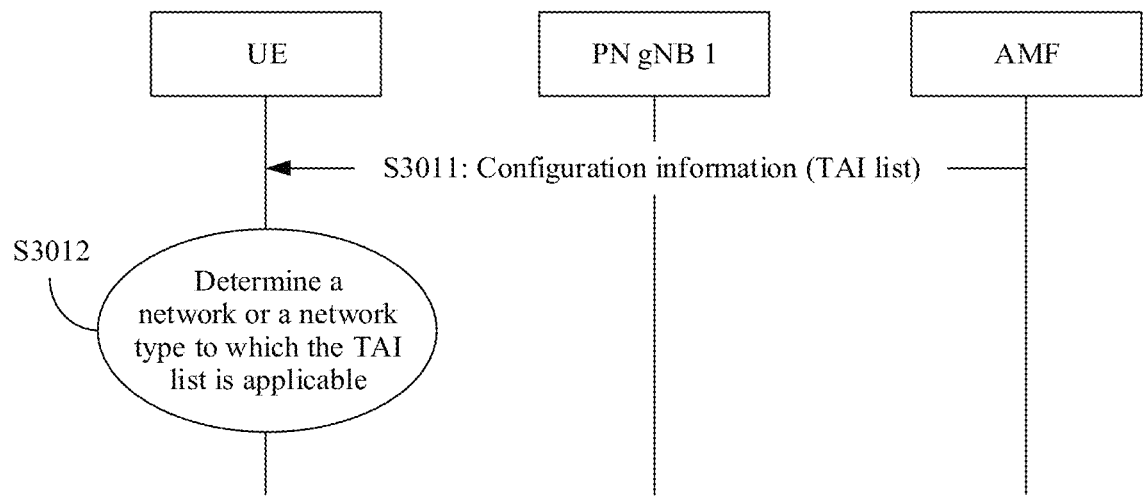
FIG. 8 is a flowchart of another solution according to an embodiment of this application.

FIG. 8 shows a case in which the paged terminal device is the terminal device in the idle state.

The solution may include the following steps.

S3011: The network device sends configuration information to the terminal device, to indicate the terminal device to enter the idle state and a mobile valid area in which the terminal device is in the idle state, for example, a TAI list. The mobile valid area is related to a network or a network type.

S3012: The terminal device determines, based on the configuration information, the network or the network type associated with (that is, valid for) the mobile valid area.

Figure 9:
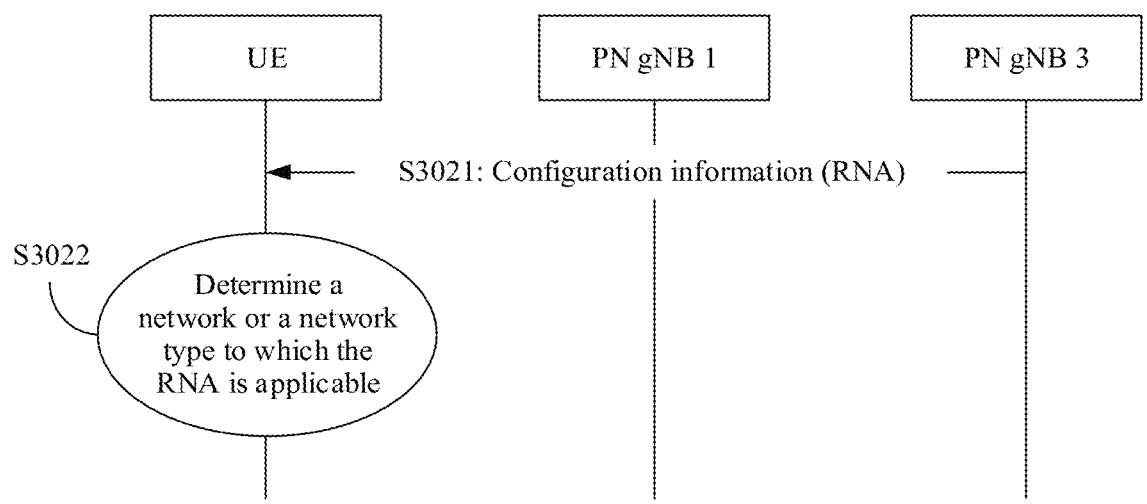
FIG. 9 is a flowchart of another solution according to an embodiment of this application.

FIG. 9 shows a case in which the paged terminal device is the terminal device in the inactive state.

S3021: The source serving network device sends configuration information to the terminal device, to indicate the terminal device to enter the inactive state and indicate a mobile valid area when the terminal device is in the inactive state, for example, an RNA. The mobile valid area is related to a network or a network type.

S3022: The terminal device determines, based on the configuration information, the network or the network type associated with (that is, valid for) the mobile valid area.

As described in the first aspect, there is a one-to-one correspondence or a many-to-one correspondence between the network and the network type. Therefore, in this embodiment of this application, the mobile valid area is related to the network, and the mobile valid area is related to the network type. Although the descriptions are different or specific actions of the terminal device are different, it can be embodied that the mobile valid area is related to the network type.

A manner of embodying that the mobile valid area in S3011 and S3021 is related to the network or the network type may be one or more of the following manners. A specific manner may be determined based on a protocol agreement, or may be determined based on the protocol agreement and an actual situation. This is not limited herein.

Manner 1: Based on predefinition in a protocol, the mobile valid area of the terminal device is applicable to only the network or the network type in which the terminal device receives the mobile valid area. For example, in a network of a second network type, for example, a public network, the received mobile valid area is applicable to only the network of the second network type. In a network of a first network type, for example, a private network, the received mobile valid area is applicable to only the network of the first network type.

Manner 2: The configuration information includes sixth information, so that the terminal device may determine, based on the sixth information, a network type to which a currently configured mobile valid area is valid, for example, valid only for the network of the first network type or valid only for the network of the second network type, or valid for both the network of the first network type and the network of the second network type. The network of the first network type or the network of the second network type is a network of a current network type for the terminal device to receive the configuration information. For example, when the configuration information includes the sixth information, it indicates that the currently configured mobile valid area is valid for both the network of the first network type and the network of the second network type. When the configuration information does not include the sixth information, it indicates that the currently configured mobile valid area is valid for only the network of the current network type. Alternatively, when the configuration information does not include the sixth information, it indicates that the currently configured mobile valid area is valid for both the network of the first network type and the network of the second network type. When the configuration information includes the sixth information, it indicates that the currently configured mobile valid area is valid for only for the network of the current network type. For another example, the sixth information has different values. When the sixth information is a first value, it indicates that the currently configured mobile valid area is valid for both the network of the first network type and the network of the second network type. When the sixth information is a second value, it indicates that the currently configured mobile valid area is valid for only the network of the current network type.

The mobile valid area is related to a network having a corresponding network type or a network type means that the currently configured mobile valid area is valid for only the network of the current network type. For example, in Manner 1, it is considered by default that the currently configured mobile valid area is valid for only the network of the current network type. Alternatively, in Manner 2, it is determined, based on the configuration information, that the currently configured mobile valid area is valid for only the network of the current network type. That the currently configured mobile valid area is the network of the second network type is used as an example. In this case, the terminal device may determine, based on one or a combination of a TAC, a RANAC, network type information, or network identifier information of a current serving cell, whether to initiate TAU/RRAU. For example, the terminal device receives the mobile valid area in a source cell, and the source cell is a cell corresponding to the second network type. The terminal device determines, based on Manner 1 or Manner 2, that the mobile valid area is applicable to only a cell of the second network type. If the terminal device moves to the current serving cell (for example, the terminal device reselects the current serving cell (also referred to as a target cell)), the terminal device determines, based on the network identifier information of the current serving cell, that a network type of the current serving cell is the first network type. Even if the TAC and/or the RANAC of the current serving cell are/is included in the mobile valid area configured for the terminal device, the terminal device still initiates the TAU procedure and/or the RNAU procedure. When the terminal device determines that the terminal device moves out of the configured mobile valid area, the terminal device initiates a location update procedure, for example, the TAU procedure and/or the RNAU procedure, to notify a network side of a new cell (namely, the current serving cell) in which the terminal device is located. Optionally, whether the location update procedure is the TAU procedure or the RNAU procedure is determined based on a network or a network type associated with the TAI list and/or a network or a network type associated with the RNA, and whether a TAC and/or a RANAC of the current serving cell of the terminal device after movement are/is included in the configured mobile valid area. For example, if the TAC and/or the RANAC of the current serving cell of the terminal device after movement is not included in the configured mobile valid area, the network or the network type associated with the TAI list and/or the RNA may not be considered, and the location update procedure is initiated. The procedure is similar to an existing location update procedure initiation process. For another example, if the TAC is still in the configured mobile valid area after movement, the network or the network type associated with the TAI list is considered. If the network or the network type associated with the TAI list is valid for only a network or a network type corresponding to a cell when the TAI list is configured, but the network or the network type of the current serving cell of the terminal device is not included in the network or the network type associated with the TAI list, the terminal device initiates the TAU procedure. Similarly, if the RANAC of the current serving cell of the terminal device is still in the configured mobile valid area after movement, the network or the network type associated with the RNA is considered. If the network or the network type associated with the RNA is valid for only a network or a network type corresponding to a cell when the RNA is configured, but the network or the network type of the current serving cell of the terminal device is not included in the network or the network type associated with the RNA, the terminal device initiates the RNAU procedure. The TAU procedure may be implemented in a manner in the prior art or in another manner, for example, implemented by using one or more of a radio resource control (connection) setup complete (RRC (connection) setup complete) message, an uplink information transfer (UL Information Transfer) message, a radio resource control (connection) resume request (RRC (connection) resume request), or a radio resource control (connection) resume complete (RRC (connection) resume complete) message. A message to be used may be determined based on a current procedure or system implementation. The RNAU may be implemented in a manner in the prior art or in another manner, for example, implemented by using the RRC resume request. For the terminal device in the idle state, after receiving the foregoing message, the network device may send a notification message to the core network device, to notify the core network device of the current serving cell of the terminal device. For the terminal device in an inactive state, after receiving the foregoing message, the network device may send a notification message to the core network device or the source serving network device, to notify the core network device or the source serving network device of the current serving cell of the terminal device.

A case in which the mobile valid area is related to the network type is that the currently configured mobile valid area is valid for both a network of a network type corresponding to a cell when the mobile valid area is configured and a network of another network type. For example, in Manner 2, it is determined, based on the configuration information, that the currently configured mobile valid area is valid for both a network corresponding to a cell configured with the mobile valid area or a network of a network type and a network of another network type. An example in which the network of the network type corresponding to the cell of the currently configured mobile valid area is the network of the second network type, and the network of the another network type is the network of the first network type is used. The terminal device moves from the network of the second network type to a cell of the network of the first network type. If a TAC and/or a RANAC of the cell of the network of the first network type are/is included in the configured mobile valid area, the terminal device may not initiate the location update procedure. If the TAC and/or the RANAC of the cell of the network of the first network type are/is not in the configured mobile valid area, the corresponding TAU procedure and/or the corresponding RNAU procedure may be initiated. A specific TAU procedure and/or a specific RNAU procedure may be similar to those/that in the prior art, and details are not described herein.

Further, the following describes a paging process when the mobile valid area is related to the network or the network type. As mentioned above, the paging process in this case may include one of the following two solutions A and B. A solution to be used may be determined based on a protocol agreement, and one of the two solutions is fixedly used. Alternatively, one of the two solutions may be determined based on a protocol agreement and an actual situation.

Solution A: The paging process does not support cross-network paging between networks of different network types.

When the paged terminal device is a terminal device in an idle state, the core network device learns of a current mobile valid area of the terminal device. When a service of the terminal device arrives at the core network device, the core network device may determine whether a network or a network type associated with the service is included in a network or a network type supported by the current mobile valid area of the terminal device. If the network or the network type associated with the service is not included in the network or the network type supported by the current mobile valid area of the terminal device, the core network device may discard the service; and/or if the network or the network type associated with the service is included in the network or the network type supported by the current mobile valid area of the terminal device, the core network device continues to transmit the service. For example, if the core network device determines that the service of the terminal device is a public network service, and the network or the network type supported by the current mobile valid area of the terminal device is the private network, the core network device may discard the public network service; and/or if the core network device determines that the service of the terminal device is a public network service, and the network or the network type supported by the current mobile valid area of the terminal device is the public network, or the public network and the private network, the core network device may continue to page the terminal device. The current mobile valid area of the terminal device in this application is a latest mobile valid area used by the terminal device. For example, the terminal device moves from a cell of the public network to a cell of the private network, and the mobile valid area received in the public network is not applicable to the cell of the private network. In this case, the terminal device initiates the location update procedure to notify the network side of the current serving cell. After learning of the current serving cell of the terminal device, the network side may update the mobile valid area of the terminal device based on the serving cell, and notify the terminal device of an updated mobile valid area. For example, the network side notifies the terminal device of the updated mobile valid area by using a radio resource control release (RRC release) message in the location update procedure, or by using a downlink information transfer (DL information transfer) message.

When the paged terminal device is a terminal device in an inactive state, the source serving network device learns of a current mobile valid area of the terminal device. When a service of the terminal device arrives at the source serving network device, the source serving network device may determine whether a network or a network type associated with the service is included in a network or a network type supported by the current mobile valid area of the terminal device. If the network or the network type associated with the service is not included in the network or the network type supported by the current mobile valid area of the terminal device, the source serving network device may discard the service. Further, if the network or the network type associated with the service is included in the network or the network type supported by the current mobile valid area of the terminal device, the source serving network device continues to transmit the service. For example, if the source serving network device determines that the service of the terminal device is a public network service, and the network or the network type supported by the current mobile valid area of the terminal device is the private network, the source serving network device may discard the public network service; and/or if the source serving network device determines that the service of the terminal device is a public network service, and the network or the network type supported by the current mobile valid area of the terminal device is the public network, or the public network and the private network, the source serving network device may continue to page the terminal device.

The core network device or the source serving network device may determine, based on a network or a network type associated with the mobile valid area of the terminal device and the network or the network type associated with the service of the terminal device, whether to trigger the paging process. The core network device may perform determining based on the network or the network type associated with the TAI list, and/or the source serving network device may perform determining based on the network or the network type associated with the RNA.

Solution B: The paging process supports cross-network paging between networks of different network types.

If the paged terminal device is the terminal device in an idle state, when a service of the terminal device arrives at the core network device, the core network device, the network device, and the terminal device may continue to perform a subsequent paging process. The paging process may be the same as that in S2012 to S2014, and details are not described herein again.

When the paged terminal device is the terminal device in an inactive state, when a service of the terminal device arrives at the source serving network device, the source serving network device, the network device, and the terminal device may continue to perform a subsequent paging process. The paging process may be the same as that in S2032 to S2034, and details are not described herein again.

A solution that the mobile valid area is related to a network or a network type may indicate the mobile valid area of the terminal device to the terminal device, so that after moving out of the mobile valid area, the terminal device may notify a network of a latest serving cell of the terminal device in a timely manner, and the network determines the mobile valid area of the terminal device based on the latest serving cell. Further, the network may select a proper data sending mechanism based on a latest mobile valid area of the terminal device. For example, the network discards the service and does not initiate corresponding paging, continues paging, performs the cross-network paging in networks of different network types, or performs paging in networks of a same network type.

Figure 10:
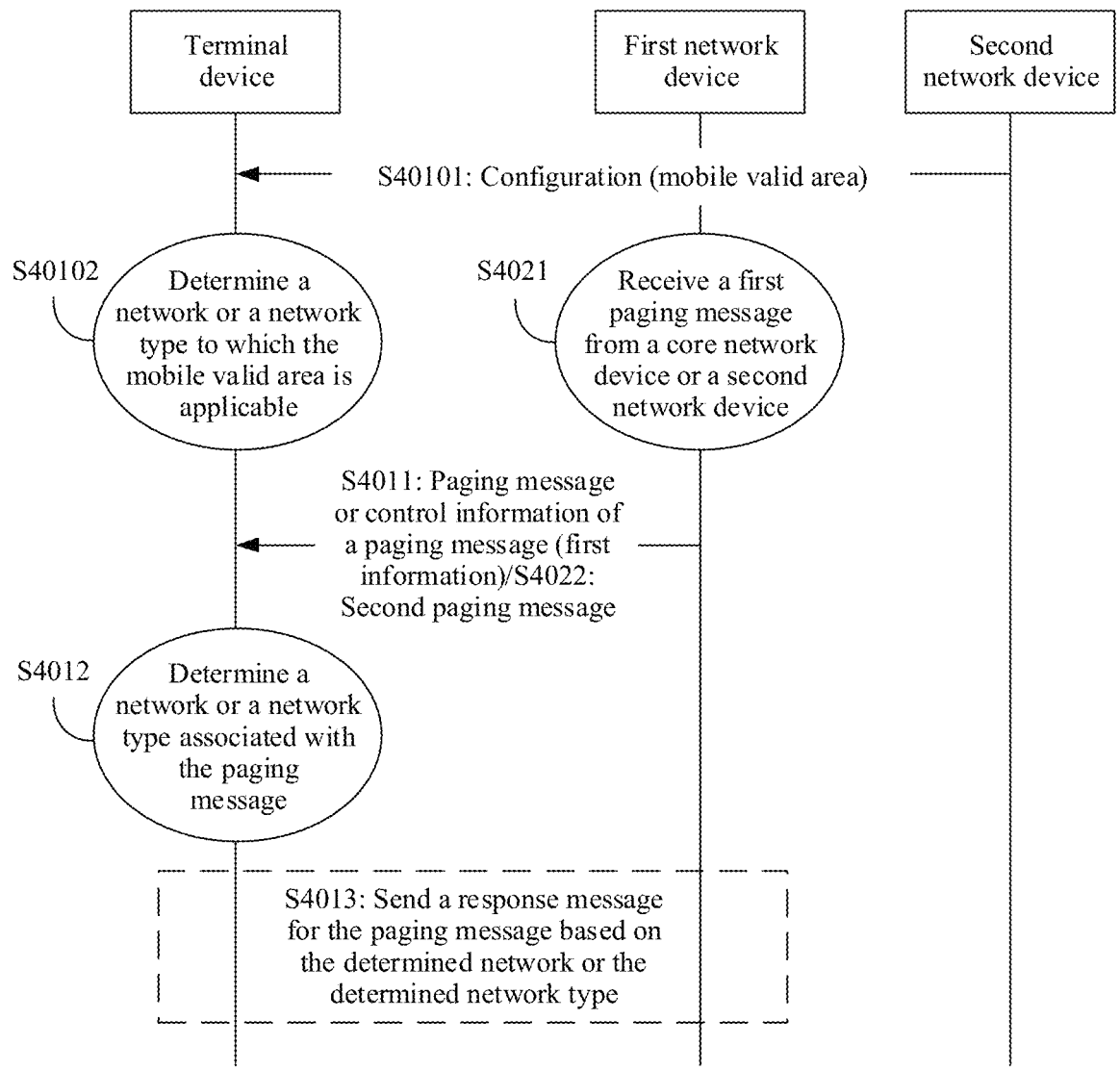
FIG. 10 is a flowchart of a communication method according to an embodiment of this application.

With reference to the foregoing embodiment corresponding to FIGS. 4-9, an embodiment of this application provides a communication method. The method may be performed by a terminal device or an apparatus used in the terminal device, for example, a processor or a chip. As shown in FIG. 10, the method includes the following steps.

S4011: Receive a paging message from a first network device, where the paging message or control information of the paging message includes first information.

S4012: Determine, based on the first information, a network associated with the paging message, where the network is a network of a first network type or a network of a second network type; or determine a network type associated with the paging message, where the network type is a first network type or a second network type.

As described in FIG. 4, there is a one-to-one correspondence or a many-to-one correspondence between the network and the network type in this application. Therefore, determining the network corresponding to the paging message and determining the network type corresponding to the paging message may replace each other.

The paging message is a paging message that is used to page the terminal device. The terminal device may be a first terminal device. There may be one or more paged first terminal devices.

Optionally, the first information may be used by the terminal device to determine a network or a network type associated with a corresponding paging message. For example, the paging message is from a public network or a private network (in other words, a service is provided by the public network or the private network), or the paging message is triggered by a public network service or a private network service. That the first information may be used by the terminal device to determine a network or a network type associated with a corresponding paging message may include: The first information may be used by the terminal device to determine network identifier information of the network associated with the corresponding paging message. For example, the paging message is from the public network or is triggered by the public network service. The first information may be public network identifier information, for example, a public land mobile network (public land mobile network, PLMN) identifier (ID). Alternatively, the paging message is from the private network or is triggered by the private network service. The first information may be private network identifier information, for example, an NPN ID or a CAG ID.

Optionally, the first information includes indication information, and the indication information is used to indicate the network or the network type associated with the paging message. For example, the associated network is a first network or a second network. A network type of the first network is the first network type and a network type of the second network is the second network type. Alternatively, the associated network type is the first network type or the second network type. For example, the first network type is a private network and the second network type is a public network. Optionally, that the indication information is used to indicate the network or the network type associated with the paging message may include: The indication information may be used to indicate network identifier information of the network associated with the paging message. The identifier information of the network type may include the public network identifier information or the private network identifier information. Further, optionally, the paging message may further include a terminal device identifier (that is, the paging message includes the terminal device identifier and the indication information). The terminal device identifier may be irrelevant to the network type. In other words, a terminal device identifier (briefly referred to as a terminal device identifier of the first network type) of the paged terminal device served by the network of the first network type (that is, in the first network) is the same as a terminal device identifier (briefly referred to as a terminal device identifier of the second network type) served by the network of the second network type (that is, in the second network). Further, optionally, the indication information is configured for the terminal device identifier. For example, the indication information is used as next-level configuration information of the terminal device identifier. The paged terminal device may determine, based on the indication information, whether the paging is from the network of the first network type or the network of the second network type. That a terminal device identifier of the first network type is the same as a terminal device identifier of the second network type means that the terminal device identifier is not used to distinguish the network type. For a same terminal device, an identifier of the terminal device is shared in networks of different network types.

The terminal device identifier may be a terminal device identifier (UE ID), for example, a terminal device identifier configured by a network side, or a terminal device identifier used for paging. This is not limited herein.

Optionally, the first information includes a terminal device identifier of the first network type (namely, an identifier of the terminal device in the first network) and/or a terminal device identifier of the second network type (namely, an identifier of the terminal device in the second network). In other words, the terminal device identifier is related to the network type. For example, the terminal device identifier of the first network type of the terminal device is different from the terminal device identifier of the second network type of the terminal device. In this case, the paged terminal device may determine, based on the terminal device identifier, whether the paging is from the network of the first network type or the network of the second network type.

Optionally, the paging message (or the control information of the paging message) may be included in a paging message that is used to page one or more terminal devices, the one or more terminal devices include the first terminal device, and the paging message that is used to page the one or more terminal devices includes a first paging list and/or a second paging list. The first paging list may include an identifier of the one or more terminal devices, and the first paging list is related to the first network or the first network type. The second paging list may include an identifier of the one or more terminal devices, and the second paging list is related to the second network or the second network type. The first information is in the first paging list or the second paging list in which the terminal device identifier (namely, an identifier of the first terminal device) is located. A manner in which the first paging list is related to the first network or the first network type, and the second paging list is related to the second network or the second network type may include respective resource locations of the first paging list and/or the second paging list, an explicit indication for the first paging list and/or the second paging list, or another implicit manner. This is not limited herein. Optionally, when the terminal device is in an idle state, the paging message of the first network device may be based on a paging message received by the first network device from a core network device. The first network device may be a base station or a DU (in a CU-DU architecture, the first network device may include a first DU and a first CU). In the CU-DU architecture, the first DU may receive a paging message from the first CU, and the paging message sent by the first CU may be based on the paging message from the core network device.

Optionally, when the terminal device is in an inactive state, the paging message of the first network device may be based on a paging message received by the first network device from another network device. The another network device may be a source serving network device (also referred to as an anchor network device). The first network device may be a base station or a DU (in a CU-DU architecture, the first network device may include a first DU and a first CU). In the CU-DU architecture, the first DU may receive a paging message from the first CU, and the paging message sent by the first CU may be based on the paging message from the another network device.

Optionally, the method may further include the following step.

S4013: Send a response message for the paging message based on the determined network type.

Optionally, a network on which the terminal device currently camps is the first network, and the network type of the first network is the first network type. The network associated with the paging message is the second network, and the network type of the second network is the second network type. In other words, the terminal device or the apparatus used in the terminal device receives the paging message in the first network.

In a possible implementation, responding to the paging message based on the determined network type includes:

sending the response message for the paging message by using the network of the first network type, where the network of the first network type has a capability of supporting a service of the second network type.

Optionally, the method may further include:

determining that the network of the first network type has the capability of supporting the service of the second network type.

Optionally, the method may further include:

receiving second information from the network of the first network type (for example, from the first network device);

determining, based on the second information, that the network of the first network type has the capability of supporting the service of the second network type; and/or determining, based on the second information, a manner in which the network of the first network type supports the service of the second network type. For the manner in which the network of the first network type supports the service of the second network type, refer to the foregoing descriptions. For example, the network of the first network type directly supports the service of the second network type or supports the service of the second network type by using an N3IWP. Details are not described herein again.

Optionally, the response message includes third information, and the third information indicates that a network type of a network associated with the response message is the second network type, or indicates that a network associated with the response message is the second network.

In another possible implementation, responding to the paging message based on the determined network type may include:

determining that the network of the first network type does not have a capability of supporting a service of the second network type;

performing cell reselection; and if the network of the second network type is reselected, sending the response message by using the network of the second network type.

Optionally, before the performing cell reselection, the method may further include:

sending fourth information (namely, the notification information in FIGS. 4-7) to the first network device by using the network of the first network type, and the fourth information is used to request to change a serving cell.

Optionally, the network of the first network type does not have the capability of supporting the service of the second network type.

Optionally, the method may further include:

receiving fifth information from the network of the first network type; and determining, based on the fifth information, that the network of the first network type does not have the capability of supporting the service of the second network type.

Optionally, the method may further include the following steps.

S40101: Receive a configuration from a second network device, where the configuration includes a mobile valid area, and the mobile valid area includes a TAI list and/or an RNA.

S40102: Determine, based on the configuration, a network or a network type to which the mobile valid area is applicable.

Optionally, when the terminal device is in the idle state, the configuration that is about the mobile valid area and that is sent by the second network device may be based on a configuration that is about the mobile valid area and that is from the core network device. The second network device may be a base station or a CU (in the CU-DU architecture, the DU may perform transparent transmission). In the CU-DU architecture, the configuration that is about the mobile valid area and that is sent by the CU may be based on the configuration that is about the mobile valid area and that is from the core network device.

Optionally, when the terminal device is in the inactive state, the second network device may be a source serving network device. The second network device may be a base station or a CU (in the CU-DU architecture, the DU may perform transparent transmission).

The network or the network type to which the mobile valid area is applicable is determined based on a rule and the configuration. The rule is that a network used to send the configuration is the network to which the mobile valid area is applicable, or, a network type of the network is the network type to which the mobile valid area is applicable.

Optionally, determining, based on the configuration, the network or the network type to which the mobile valid area is applicable may include:

The configuration further includes sixth information, and the sixth information indicates the network or the network type to which the mobile valid area is applicable. The network includes the first network and/or the second network, and the network type includes the first network type and/or the second network type.

The network or the network type to which the mobile valid area is applicable is determined based on the sixth information.

For example, when the sixth information is set to a first value, it indicates that the network type to which the mobile valid area is applicable is a network type of a network used to currently send and/or receive the configuration (in other words, a network to which a cell that currently sends and/or receives the configuration belongs). When the sixth information is set to a second value, it indicates that the network type to which the mobile valid area is applicable is a network type of a network used to currently send and/or receive the configuration and another network type. Alternatively, when the sixth information exists (or is valid), it indicates that the network type to which the mobile valid area is applicable is a network type of a network used to currently send and/or receive the configuration. When the sixth information does not exist (or is invalid), it indicates that the network type to which the mobile valid area is applicable is a network type of a network used to currently send and/or receive the configuration and another network type. Alternatively, when the sixth information does not exist (or is invalid), it indicates that the network type to which the mobile valid area is applicable is a network type of a network used to currently send and/or receive the configuration. When the sixth information exists (or is valid), it indicates that the network type to which the mobile valid area is applicable is a network type of a network used to currently send and/or receive the configuration and another network type. A manner to be used may be determined based on a protocol, in default or by selecting based on a condition, or may be determined based on the protocol and an actual system design. This is not limited herein. Alternatively, when the sixth information is set to a first value, it indicates that the network to which the mobile valid area is applicable is a network to which a cell that currently sends and/or receives the configuration belongs. When the sixth information is set to a second value, it indicates that the network to which the mobile valid area is applicable is a network to which a cell that currently sends and/or receives the configuration belongs and a network of another network type. Alternatively, when the sixth information exists (or is valid), it indicates that the network to which the mobile valid area is applicable is a network to which a cell that currently sends and/or receives the configuration belongs. When the sixth information does not exist (or is invalid), it indicates that the network to which the mobile valid area is applicable is a network to which a cell that currently sends and/or receives the configuration belongs and a network of another network type. Alternatively, when the sixth information does not exist (or is invalid), it indicates that the network to which the mobile valid area is applicable is a network to which a cell that currently sends and/or receives the configuration belongs. When the sixth information exists (or is valid), it indicates that the network to which the mobile valid area is applicable is a network to which a cell that currently sends and/or receives the configuration belongs and a network of another network type. A manner to be used may be determined based on a protocol, in default or by selecting based on a condition, or may be determined based on the protocol and an actual system design. This is not limited herein.

Optionally, the method may further include:

When a current serving cell to which the terminal device moves is not included in a cell corresponding to the network or the network type to which the mobile valid area is applicable, the terminal device initiates a location update procedure. In other words, when a network type supported by the current serving cell of the terminal device does not include the network type to which the mobile valid area is applicable, or when a network supported by the current serving cell of the terminal device does not include the network to which the mobile valid area is applicable, the terminal device initiates the location update procedure.

Optionally, the first network type is a public network and the second network type is a private network, or the first network type is a private network and the second network type is a public network.

Optionally, the terminal device supports services of the first network type and the second network type.

According to the method provided in this embodiment of this application, the terminal device may learn of, regardless of whether the terminal device is in the idle state or the inactive state, a network or a network type associated with current paging, and further make a corresponding response based on the network or the network type associated with the current paging. Further, the network or the network type to which the mobile valid area is applicable may further be learned. In this way, when the terminal device moves to a cell other than the cell corresponding to the network or the network type to which the mobile valid area is applicable, the terminal device may initiate the location update procedure to notify the network device and/or the core network device of the current serving cell of the terminal device, so that the network device and/or the core network device perform/performs subsequent processing based on a network or a network type associated with a service of the terminal device and the network or the network type supported by the current serving cell of the terminal device. For specific processing, refer to descriptions in other embodiments. Details are not described herein.

With reference to the foregoing embodiment corresponding to FIGS. 4-9, and corresponding to the foregoing descriptions corresponding to FIG. 10, an embodiment of this application further provides a communication method. The method may be performed by a first network device or an apparatus used in the first network device, for example, a processor or a chip. The first network device may be a base station, or a DU or CU (in a CU-DU architecture). In the CU-DU architecture, there is an air interface between the DU and a terminal device. Communication between the CU and the terminal device is performed by using the DU, but not all transparent transmission is performed by the DU. For example, for paging, the DU does not transparently transmit a paging message from the CU. Paging that is of a plurality of terminal devices and that is received from the CU may be recombined based on a paging occasion (PO) and then sent. Content of the paging message of the air interface may further be determined based on one or more of information such as a discontinuous reception (DRX) cycle and a paging priority of the terminal device. Details are not described herein. For a paging response from the terminal device, the DU may transparently transmit the paging response to the CU as a common PDCP data packet. For whether the information is transparently transmitted or is transmitted after being processed, refer to a manner in the prior art. Another manner may alternatively be used. This is not limited herein. As shown in FIG. 10, the method may include the following steps.

S4022: Send a second paging message to the terminal device.

The second paging message or control information of the second paging message includes first information, and the first information is related to a network or a network type associated with the second paging message.

Optionally, the first network device may send the second paging message to the terminal device by using a first network (that is, in the first network). In other words, the first network device may be a network device to which a cell of the first network belongs. The terminal device that receives the second paging message camps on the cell of the first network.

Optionally, the method may further include: generating the second paging message.

Optionally, the method may further include the following step.

S4021: Receive a first paging message from a core network device or a second network device.

When a paged terminal device is in an idle state, the first network device may receive the first paging message from the core network device. When the paged terminal device is in an inactive state, the first network device may receive the first paging message from the second network device. The second network device may be a source serving network device.

Optionally, the first network device may send the second paging message based on the first paging message. The second paging message may be sent by the first network device based on content of the first paging message. For example, the second paging message is sent based on an identifier of the paged terminal device and other information, for example, a PO corresponding to different terminal devices.

Optionally, the first information may be used by the terminal device to determine a network or a network type associated with a corresponding paging message. For example, the paging message is from a public network or a private network (in other words, a service is provided by the public network or the private network), or the paging message is triggered by a public network service or a private network service. Optionally, that the first information may be used by the terminal device to determine a network or a network type associated with a corresponding paging message includes that the first information may be used by the terminal device to determine network identifier information of the network associated with the corresponding paging message. For example, the paging message is from the public network or is triggered by the public network service. The first information may be public network identifier information, for example, a public land mobile network (public land mobile network, PLMN) identifier (ID). Alternatively, the paging message is from the private network or is triggered by the private network service. The first information may be private network identifier information, for example, an NPN ID or a CAG ID.

Optionally, the first information includes indication information, and the indication information is used to indicate the network or the network type associated with the second paging message, for example, a first network type or a second network type. Optionally, that the indication information is used to indicate the network or the network type associated with the paging message may include that the indication information may be used to indicate network identifier information of the network associated with the paging message. Identifier information of the network type may include the public network identifier information or the private network identifier information. Further, optionally, the second paging message further includes a terminal device identifier of the terminal device (the second paging message includes the terminal device identifier and the indication information). A terminal device identifier of the first network type of the terminal device is the same as a terminal device identifier of the second network type of the terminal device. Further, optionally, the indication information is configured for the terminal device identifier.

Optionally, the first information includes a terminal device identifier of the terminal device in the first network and/or a terminal device identifier of the terminal device in a second network. The terminal device identifier of the terminal device in the first network is different from the terminal device identifier of the terminal device in the second network. A network type of the first network is the first network type, and a network type of the second network is the second network type.

Optionally, the second paging message is included in a paging message that is used to page one or more terminal devices, and the paging message that is used to page the one or more terminal devices includes a first paging list and/or a second paging list. The first paging list may include an identifier of the one or more terminal devices, and the first paging list is related to the first network. The second paging list may include an identifier of the one or more terminal devices, and the second paging list is related to the second network. The first information is in a paging list in which the terminal device identifier is located.

Optionally, the method may further include:
receiving a response message that is of the second paging message and that is from the terminal device.

A network on which the terminal device currently camps is the first network, and the network associated with the paging message is the second network.

When the first network device includes a first CU and a first DU, the first CU receives the response message that is for the second paging message and that is from the terminal device.

The first DU may transparently transmit the response message.

Optionally, the receiving a response message that is for the second paging message and that is from the terminal device includes:
receiving the response message for the paging message by using a network of the first network type, where the network of the first network type has a capability of supporting a service of a network of the second network type. Further, optionally, the method may further include: transmitting the service from the network of the second network type by using the network of the first network type.

Optionally, the method may further include:
sending second information to the terminal device, where the second information indicates that the network of the first network type has the capability of supporting the service of the second network type, and/or the second information indicates a manner in which the network of the first network type supports the service of the second network type. For example, the network of the first network type directly supports the service of the second network type or supports the service of the second network type by using an N3IWP. Optionally, the second information may be carried in system information.

Optionally, the response message includes third information, the third information indicates that a network associated with the response message is the second network type or the second network, and the network type of the second network is the second network type.

Optionally, the receiving a response message that is for the second paging message and that is from the terminal device may include:
receiving access of the terminal device by using a network of the second network type, that is, receiving the access of the terminal device in the second network; and
receiving the response message from the terminal device by using the network of the second network type, that is, receiving the response message in the second network.

In this case, the first network device supports both the network of the first network type and the network of the second network type. The terminal device performs cell reselection caused by network type switching to reselect the first network device, and performs the access on the first network device.

Optionally, the method may further include:
receiving fourth information from the terminal device by using the network of the first network type, where the fourth information is used to request to change a serving cell.

When the first network device includes the first CU and the first DU, the first CU receives the fourth information from the terminal device. The first DU may transparently transmit the fourth information.

Optionally, the method may further include:
sending fifth information to the terminal device, where the fifth information indicates that the network of the first network type does not have the capability of supporting the service of the network of the second network type. Optionally, the fifth information may be carried in the system information. Optionally, the fifth information and the second information may be different values of a same information element or different information elements.

Optionally, the method may further include:
determining, based on the first paging message, that a network associated with the first paging message is the first network or the second network, or that a network type associated with the first paging message is the first network type or the second network type.

Optionally, the first paging message includes seventh information, and the seventh information is related to the network or the network type associated with the first paging message. The seventh information indicates that the network associated with the first paging message is the first network or the second network, or that the network type associated with the first paging message is the first network type or the second network type.

For a manner in which the seventh information indicates the network related to the first paging message or the network type associated with the first paging message, refer to the descriptions about how the first information indicates the network or the network type associated with the second paging message when the first information included in the second paging message or the control information of the second paging message indicates the network or the network type associated with the second paging message. It may be understood that the manner in which the seventh information indicates the network or the network type related to the first paging message may be the same as or different from the manner in which the first information indicates the network or the network type related to the second paging message. Generally, the network or the network type related to the first paging message is the same as the network or the network type related to the second paging message.

Optionally, the first network type is a public network and the second network type is a private network, or the first network type is a private network and the second network type is a public network.

Optionally, the method may further include:
performing TAU and/or RNAU of the terminal device, where a network type supported by a current serving cell of the terminal device does not include a network type related to a mobile valid area of the terminal device, or a network supported by a current serving cell of the terminal device does not include a network related to a mobile valid area of the terminal device. When the first network device has the CU-DU architecture (in other words, the first network device includes the first CU and the first DU), the first CU performs the TAU and/or the RNAU of the terminal device. The first DU may perform transparent transmission in the TAU and/or the RNAU.

A specific manner of the TAU and/or the RNAU may be the same as that of TAU and/or RNAU in the prior art. The TAU and/or the RNAU in the prior art may alternatively be other TAU and/or RNAU. Details are not described herein.

With reference to the foregoing embodiment corresponding to FIGS. 4-9, and corresponding to the foregoing descriptions corresponding to FIG. 10, an embodiment of this application further provides a communication method. The method may be performed by a second network device or a processor used in the second network device, for example, a chip. The second network device may be a base station or a second CU (in a CU-DU architecture, the second network device may include the second CU and a second DU, and the second DU may perform transparent transmission). The second network device may be a source serving network device of a terminal device. The method may include:
sending a second configuration to the terminal device, where the second configuration includes a mobile valid area of the terminal device, and the mobile valid area includes a TAI list and/or an RNA.

Optionally, the foregoing terminal device is in an idle state or an inactive state.

Optionally, the mobile valid area is related to a network having a corresponding network type or a network type.

Optionally, for a manner in which the second configuration indicates the network or the network type related to the mobile valid area, refer to descriptions in other embodiments. For example, a network or a network type of the network used to send the second configuration is used for indication, or sixth information included in the second configuration is used for indication. Details are not described herein again. An indication manner may be determined based on a protocol, or may be determined based on the protocol and an actual system design. This is not limited herein.

Optionally, the method may further include:
receiving a first configuration from a core network device, where the first configuration includes a mobile valid area. Optionally, the mobile valid area may include a TAI list, and the mobile valid area is related to a network or a network type. In this case, the foregoing terminal device is in an idle state.

Optionally, for a manner in which the first configuration indicates the network or the network type related to the mobile valid area, refer to descriptions in other embodiments, for example, the descriptions about the manner in which the second configuration indicates the network or the network type related to the mobile valid area. Details are not described herein again. An indication manner may be determined based on a protocol, or may be determined based on the protocol and an actual system design. This is not limited herein. It may be understood that the manner in which the first configuration indicates the network or the network type related to the mobile valid area may be the same as or different from the manner in which the second configuration indicates the network or the network type related to the mobile valid area. Generally, the network type that is related to the mobile valid area and that is indicated by the first configuration is the same as the network type that is related to the mobile valid area and that is indicated by the second configuration. The network that is related to the mobile valid area and that is indicated by the first configuration may include the network that is related to the mobile valid area and that is indicated by the second configuration.

Correspondingly, an embodiment of this application further provides a communication method. The method may be performed by a second network device or a processor used in the second network device, for example, a chip. The second network device may be a base station or a second DU (in a CU-DU architecture, the second network device may include a second CU and the second DU). The method may include:
sending a first paging message 1 to a first network device, where the first paging message 1 is related to a network having a corresponding network type or a network type.

Optionally, the first paging message 1 includes seventh information 1, and the seventh information 1 is related to the network or the network type associated with the first paging message 1. In other words, the seventh information 1 indicates that the network associated with the first paging message 1 is a first network or a second network, and the associated network type is a first network type or a second network type. A network type of the first network is the first network type and a network type of the second network is the second network type.

For a manner in which the seventh information 1 indicates the network or the network type related to the first paging message 1, refer to the descriptions about how the first information indicates the network or the network type associated with the second paging message when the first information included in the second paging message or the control information of the second paging message indicates the network or the network type associated with the second paging message. It may be understood that the manner in which the seventh information 1 indicates the network or the network type related to the first paging message 1 may be the same as or different from the manner in which the first information indicates the network or the network type related to the second paging message. Generally, the network type related to the first paging message 1 is the same as the network type related to the second paging message. Optionally, the network related to the first paging message 1 may include the network related to the second paging message.

Correspondingly, an embodiment of this application further provides a communication method. The method may be performed by a core network device or a processor used in the core network device, for example, a chip. The method may include:

sending a first paging message 2 to a first network device, where the first paging message 2 is related to a network or a network type.

Optionally, the first paging message 2 includes seventh information 2, and the seventh information 2 is related to the network or the network type associated with the first paging message 2. In other words, the seventh information 2 is used to indicate that the network type associated with the first paging message 2 is a first network type or a second network type, or the related network is a first network or a second network. A network type of the first network is the first network type, and a network type of the second network is the second network type.

For a manner in which the seventh information 2 is related to the network or the network type associated with the first paging message 2, refer to the descriptions about how the first information indicates the network or the network type associated with the second paging message (or the descriptions about how the first information is related to the network or the network type associated with the second paging message) when the first information included in the second paging message or the control information of the second paging message is related to the network or the network type associated with the second paging message. It may be understood that the manner in which the seventh information 2 indicates the network or the network type related to the first paging message 2 may be the same as or different from the manner in which the first information indicates the network or the network type related to the second paging message. Generally, the network type related to the first paging message 2 is the same as the network type related to the second paging message. Optionally, the network related to the first paging message 2 may include the network related to the second paging message.

It may be understood that the first paging message 2 in this embodiment and the first paging message 1 sent by the second network device may be different paging messages. For example, the first paging message 2 is a paging message when the terminal device is in an idle state, and the first paging message 1 is a paging message when the terminal device is in an inactive state.

According to the foregoing method, the terminal device may learn of a network or a network type associated with current paging, and further make a corresponding response based on the network or the network type associated with the current paging. In this way, cross-network paging between networks of different network types can be supported. A current serving network device (a network device in which a current serving cell is located) of the terminal device may further learn of the network or the network type associated with current paging. Further, the terminal device may further learn of a network or a network type to which a current mobile valid area is applicable. In this way, when the terminal device moves to a cell other than a cell corresponding to the network or the network type to which the current mobile valid area is applicable, the terminal device may initiate a location update procedure.

Figure 11:
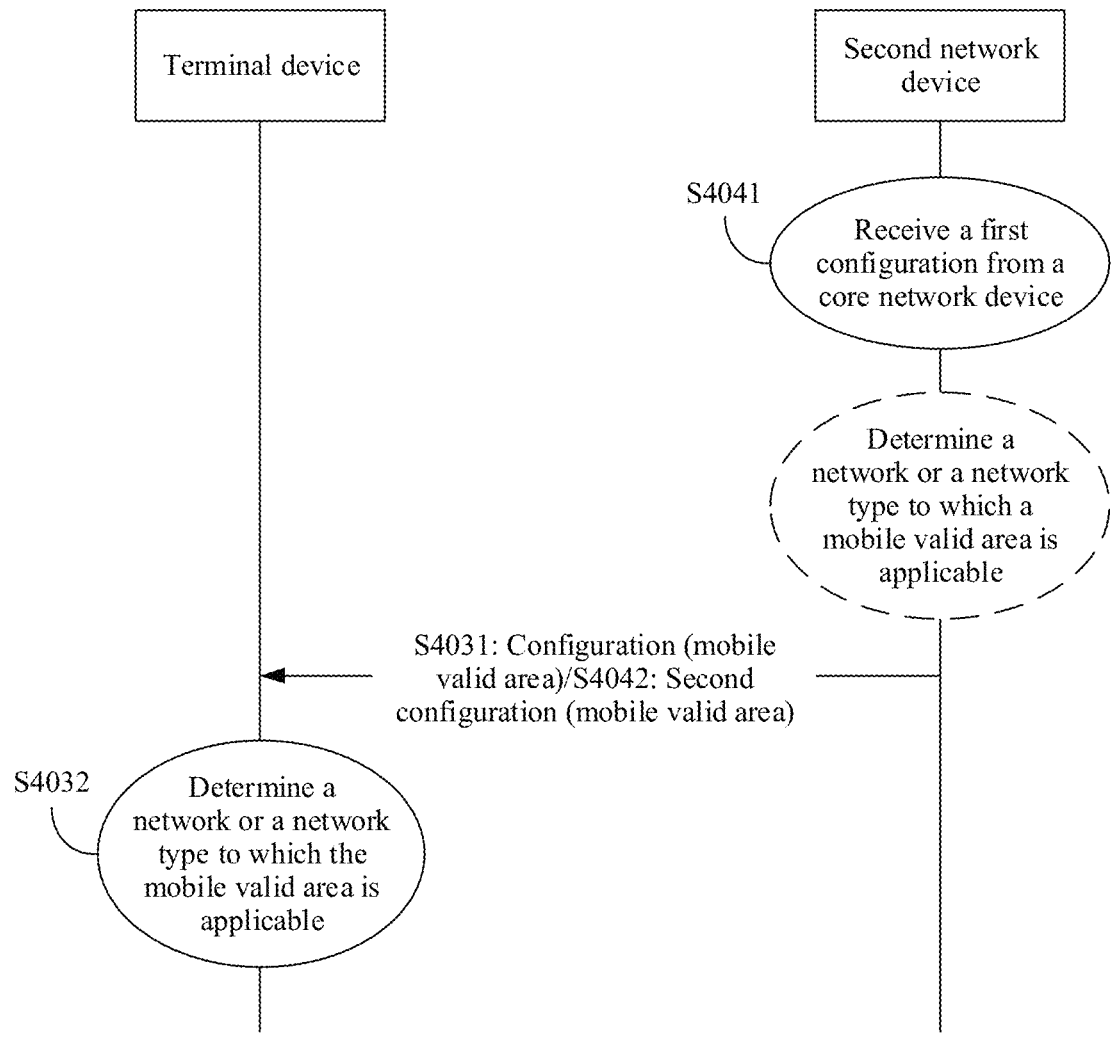
FIG. 11 is a flowchart of a communication method according to an embodiment of this application.

With reference to the foregoing embodiment corresponding to FIGS. 4-9, an embodiment of this application further provides a communication method. The method may be performed by a terminal device or a processor used in the terminal device, for example, a chip. As shown in FIG. 11, the method includes the following steps.

S4031: Receive a configuration from a second network device, where the configuration includes a mobile valid area.

S4032: Determine a network or a network type to which the mobile valid area is applicable. The network type includes a first network type and/or a second network type, and the network includes a first network and/or a second network. A network type of the first network is the first network type, and a network type of the second network is the second network type.

Optionally, when the terminal device is in an idle state, the configuration that is about the mobile valid area and that is sent by the second network device may be based on a configuration that is about the mobile valid area and that is from a core network device. The second network device may be a base station or a CU (in a CU-DU architecture, a DU may perform transparent transmission).

Optionally, when the terminal device is in an inactive state, the second network device may be a source serving network device. The second network device may be a base station or a CU (in a CU-DU architecture, a DU may perform transparent transmission).

Optionally, determining the network type to which the mobile valid area is applicable includes: determining that the mobile valid area is applicable to only the first network type by receiving the configuration by using a network of the first network type (that is, receiving the configuration in the network of the first network type); or determining that the mobile valid area is applicable to only the second network type by receiving the configuration by using a network of the second network type. Alternatively, determining the network to which the mobile valid area is applicable includes: determining that the mobile valid area is applicable to only the first network by receiving the configuration through the first network (that is, receiving the configuration in the first network); or determining that the mobile valid area is applicable to only the second network by receiving the configuration through the second network.

Optionally, the configuration further includes sixth information, and the sixth information indicates the network type or the network to which the mobile valid area is applicable. The network type includes the first network type and/or the second network type, and the network includes the first network and/or the second network. The network type of the first network is the first network type, and the network type of the second network is the second network type.

Optionally, the method may further include:

When a network type supported by the terminal device in a current serving cell does not include the network type to which the mobile valid area is applicable, the terminal device initiates tracking area update TAU or radio access network notification area update RNAU to a first network device in which the current serving cell is located, to indicate the current serving cell of the terminal device to a network side. Alternatively, when a network supported by the terminal device in a current serving cell does not include the network to which the mobile valid area is applicable, the terminal device initiates tracking area update TAU or radio access network notification area update RNAU to a first network device in which the current serving cell is located, to indicate the current serving cell of the terminal device to a network side.

For example, the mobile valid area received by UE in the idle/inactive state in a cell 1 is a TAI list including a TAI 1 and a TAI 2, and is valid for only a public network. When the UE moves to a cell 2, the cell 2 belongs to the TAI 1 but the cell 2 is a cell in a private network. For example, the UE determines, based on a CAG ID or other indication information broadcast by the cell 2, that a network type of the cell is the private network. In this case, the UE initiates TAU.

Similarly, an RNA of the mobile valid area received by the UE in the inactive state in the cell 1 includes a RANAC, for example, a RANAC 1, and is valid for only the public network. When the UE moves to the cell 2, the cell 2 belongs to the RANAC 1 but the cell 2 is a cell in the private network. For example, the UE determines, based on the CAG ID or the other indication information broadcast by the cell 2, that the network type of the cell is the private network. In this case, the UE initiates RNAU.

Optionally, when the terminal device is in the idle state, the terminal device initiates the TAU.

Optionally, when the terminal device is in the inactive state, the terminal device initiates the RNAU.

Optionally, the TAU may include at least one of an RRC setup complete message, a UL information transfer message, or an RRC resume request. In other words, the TAU may be implemented by using at least one of the RRC setup complete message, the UL information transfer message, or the RRC resume request.

Optionally, the RNAU may include an RRC resume request. In other words, the RNAU may be implemented by using the RRC resume request.

Optionally, the first network type is a public network and the second network type is a private network, or the first network type is a private network and the second network type is a public network.

Optionally, the terminal device supports services of the first network type and the second network type.

Optionally, when the terminal device is paged, paging-related steps performed by the terminal device in the descriptions corresponding to FIG. 10 are performed.

In the method provided in this embodiment of this application, the terminal device may learn of the network or the network type to which the mobile valid area is applicable. In this way, when the terminal device moves to a cell other than a cell corresponding to the network or the network type to which the mobile valid area is applicable, the terminal device may initiate a location update procedure to notify the second network device and/or the core network device of the current serving cell of the terminal device, so that the second network device and/or the core network device perform/performs subsequent processing based on a network or a network type associated with a service of the terminal device and the network or the network type supported by the current serving cell of the terminal device. For specific processing, refer to descriptions in other embodiments. Details are not described herein.

With reference to the foregoing embodiment corresponding to FIGS. 4-9, and corresponding to the foregoing descriptions corresponding to FIG. 11, an embodiment of this application further provides a communication method. The method may be performed by a second network device or a processor used in the second network device, for example, a chip. The second network device may be a base station or a CU (in a CU-DU architecture). As shown in FIG. 11, the method may include the following steps.

S4041: Receive a first configuration from a core network device, where the first configuration includes a mobile valid area.

S4042: Send a second configuration to a terminal device, where the second configuration includes the mobile valid area.

The mobile valid area is related to a network or a network type.

Optionally, the network type includes a first network type and/or a second network type, and the network includes a first network and/or a second network. A network type of the first network is the first network type, and a network type of the second network is the second network type.

Optionally, the method may further include:

determining the network or the network type to which the mobile valid area is applicable.

For a manner about how the first configuration indicates the mobile valid area related to the network or the network type and a manner about how the second configuration indicates the mobile valid area related to the network or the network type, refer to the embodiment corresponding to FIGS. 4-9, and the descriptions corresponding to FIG. 11, for example, the descriptions about determining the network or the network type to which the mobile valid area is applicable and the descriptions of the sixth information in the descriptions corresponding to FIG. 11. Details are not described herein again. It may be understood that the manner in which the first configuration indicates the mobile valid area related to the network or the network type may be the same as or different from the manner in which the second configuration indicates the mobile valid area related to the network or the network type. Generally, for a same mobile valid area, the network or the network type that is related to the mobile valid area and that is indicated by the first configuration is the same as the network or the network type that is related to the mobile valid area and that is indicated by the second configuration.

Optionally, the method may further include:

receiving a service of the terminal device, and discarding the service when a network or a network type related to the service is not included in a network or a network type (to which a current mobile valid area is applicable) supported by the current mobile valid area of the terminal device.

Alternatively, the method may further include:

receiving a service of the terminal device, and performing paging-related steps performed by the second network device in the foregoing descriptions corresponding to FIG. 10.

With reference to the foregoing embodiment corresponding to FIGS. 4-9, and corresponding to the foregoing descriptions corresponding to FIG. 11, an embodiment of this application further provides a communication method. The method may be performed by a first network device or a processor used in the first network device, for example, a chip. The first network device may be a base station or a CU (in a CU-DU architecture). As shown in FIG. 11, the method may include:

performing tracking area update TAU or radio access network notification area update RNAU of a terminal device, where a network or a network type supported by a current serving cell of the terminal device does not include a network or a network type associated with the mobile valid area. For a TAU method and/or an RNAU method, refer to descriptions in the prior art or in other embodiments. Details are not described herein.

Optionally, the method may further include:

receiving a service of a terminal device, and discarding the service when a network or a network type related to the service is not included in a network or a network type to which a current mobile valid area of the terminal device is applicable.

Alternatively, the method may further include:

receiving a service of a terminal device, and performing paging-related steps performed by the first network device in the foregoing descriptions corresponding to FIG. 10.

Correspondingly, an embodiment of this application further provides a communication method. The method may be performed by a core network device or a processor used in the core network device, for example, a chip. The method may include:

sending a first configuration to a first network device, where the first configuration includes a mobile valid area, and the mobile valid area is related to a network or a network type.

According to the communication methods provided in the embodiments of this application, the mobile valid area is related to the network or the network type, and at least two of the core network device, the network device, or the terminal device may learn of the network or the network type related to the mobile valid area, to perform subsequent corresponding processing based on the network or the network type related to the mobile valid area, for example, perform the TAU and/or the RNAU. The network device may include a source serving network device and/or a target serving network device. The target serving network device is a current serving network device, that is, a network device in which a current serving cell is located.

It may be understood that all the foregoing embodiments may be implemented independently or in combination. This is not limited herein. Mutual reference may be made to the descriptions in the foregoing embodiments.

The foregoing describes in detail the communication methods in the embodiments of this application with reference to FIGS. 4-11. The following describes in detail communications apparatuses in the embodiments of this application with reference to FIG. 12 to FIG. 14.

Figure 12:
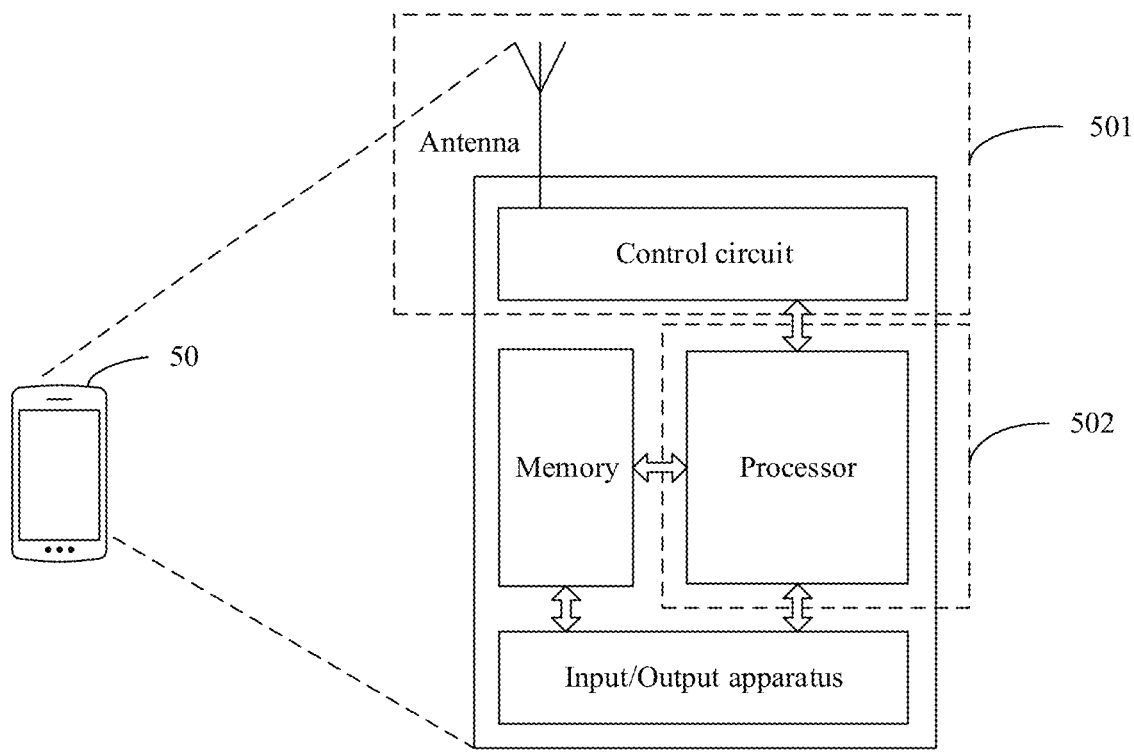
FIG. 12 is a diagram of a terminal device according to an embodiment of this application.

FIG. 12 is a diagram of a terminal device according to an embodiment of this application. The terminal device may be used in the system shown in FIG. 1, to perform a function of the terminal device in the foregoing method embodiments. For ease of description, FIG. 12 shows only main means of the terminal device. As shown in FIG. 12, the terminal device 50 includes a processor, a memory, a control circuit, an antenna, and an input/output apparatus. The processor is mainly configured to process a communication protocol and communication data, control the entire terminal device, execute a software program, and process data of the software program, for example, configured to support the terminal device in performing actions described in the foregoing method embodiments. The memory is mainly configured to store the software program and the data. The control circuit is mainly configured to perform conversion between a baseband signal and a radio frequency signal, and process the radio frequency signal. A combination of the control circuit and the antenna may also be referred to as a transceiver mainly configured to receive/send a radio frequency signal in a form of an electromagnetic wave. The input/output apparatus, for example, a touchscreen, a display screen, or a keyboard, is mainly configured to receive data entered by a user and output data to the user.

After the terminal device is powered on, the processor may read the software program in the memory, explain and execute an instruction of the software program, and process the data of the software program. When data needs to be sent in a wireless manner, after performing baseband processing on the to-be-sent data, the processor outputs a baseband signal to a radio frequency circuit. After performing radio frequency processing on the baseband signal, the radio frequency circuit sends a radio frequency signal to the outside through the antenna in the form of the electromagnetic wave. When data is sent to the terminal device, the radio frequency circuit receives a radio frequency signal through the antenna, converts the radio frequency signal into a baseband signal, and outputs the baseband signal to the processor. The processor converts the baseband signal into data and processes the data.

A person skilled in the art may understand that for ease of description, FIG. 12 shows only one memory and only one processor. In an actual terminal device, there may be a plurality of processors and a plurality of memories. The memory may also be referred to as a storage medium, a storage device, or the like. The memory may be a storage element located on a same chip as the processor, namely, an on-chip storage element, or an independent storage element. This is not limited in this embodiment of this application.

In an optional implementation, the terminal device may include a baseband processor and a central processing unit. The baseband processor is mainly configured to process the communication protocol and the communication data. The central processing unit is mainly configured to control the entire terminal device, execute the software program, and process the data of the software program. The processor in FIG. 12 may integrate functions of the baseband processor and the central processing unit. A person skilled in the art may understand that the baseband processor and the central processing unit may alternatively be independent processors, and interconnected by using a technology, for example, a bus. A person skilled in the art may understand that the terminal device may include a plurality of baseband processors to adapt to different network standards, the terminal device may include a plurality of central processing units to improve a processing capability of the terminal device, and means of the terminal device may be connected through various buses. The baseband processor may also be expressed as a baseband processing circuit or a baseband processing chip. The central processing unit may also be expressed as a central processing circuit or a central processing chip. A function of processing the communication protocol and the communication data may be built in the processor, or may be stored in the memory in a form of a software program. The processor executes the software program to implement a baseband processing function.

In this embodiment of this application, the control circuit and the antenna having a transceiver function may be considered as a transceiver unit 501 of the terminal device 50. For example, the transceiver unit is configured to support the terminal device in performing a receiving function and a sending function. The processor 502 having a processing function is considered as a processing unit 502 of the terminal device 50. As shown in FIG. 12, the terminal device 50 includes the transceiver unit 501 and the processing unit 502. The transceiver unit may also be referred to as a transceiver, a transceiving device, a transceiver apparatus, or the like. Optionally, a component configured to implement the receiving function in the transceiver unit 501 may be considered as a receiving unit, and a component configured to implement the sending function in the transceiver unit 501 may be considered as a sending unit. In other words, the transceiver unit 501 includes the receiving unit and the sending unit. The receiving unit may also be referred to as a receiver, an input port, a receiver circuit, or the like. The sending unit may be referred to as a transmitter, a transmitting device, a transmitter circuit, or the like.

The processor 502 may be configured to execute an instruction stored in the memory, to control the transceiver unit 501 to receive a signal and/or send a signal, so as to complete the function of the terminal device in the foregoing method embodiments. The processor 502 further includes an interface, configured to implement a signal input/output function. In an implementation, it may be considered that the functions of the transceiver unit 501 are implemented by using a transceiver circuit or a special-purpose transceiver chip.

Figure 13:
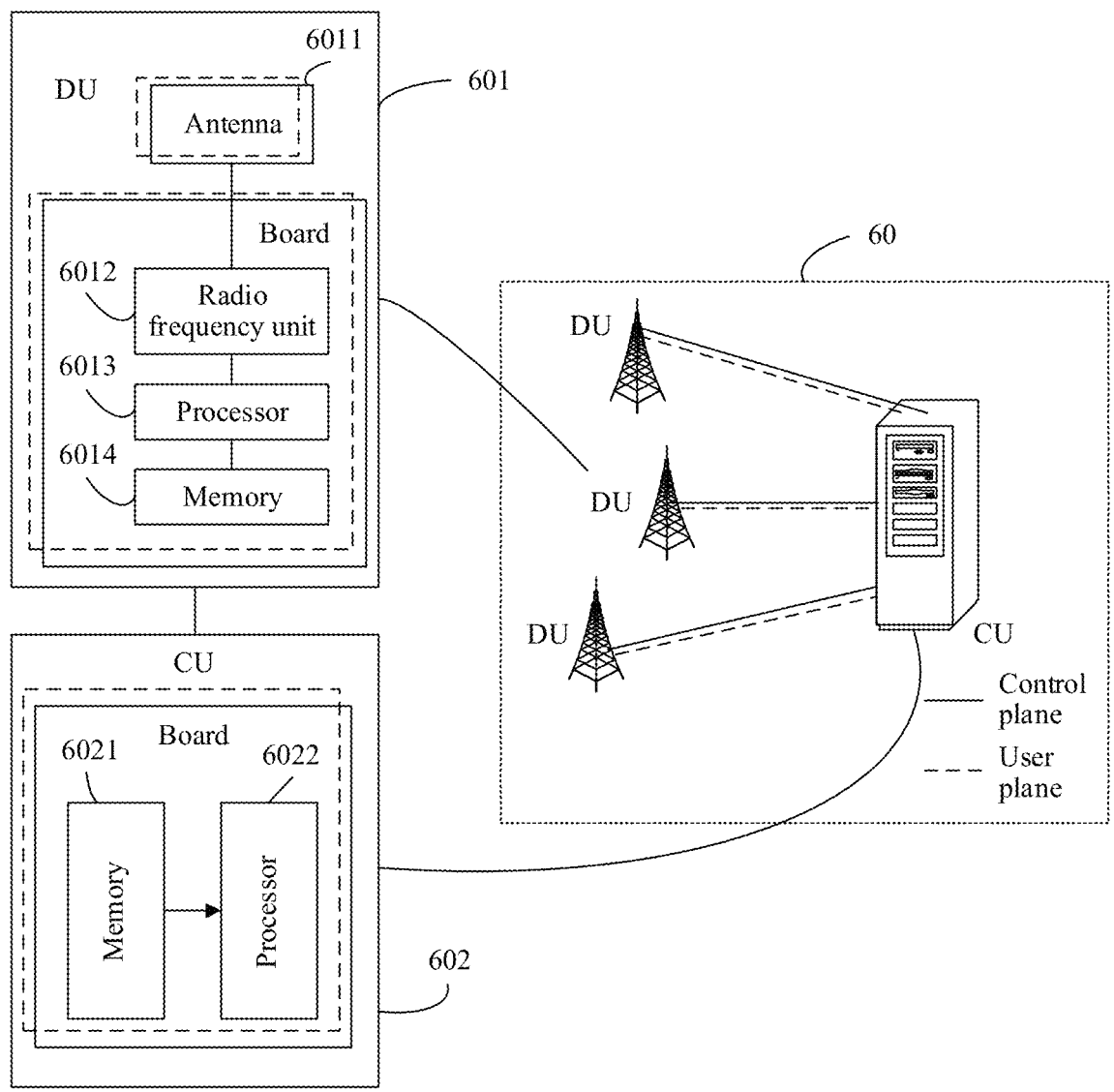
FIG. 13 is a diagram of a network device according to an embodiment of this application.

FIG. 13 is a diagram of a network device (for example, a first network device or a second network device) according to an embodiment of this application. For example, FIG. 13 may be a diagram of a base station. As shown in FIG. 13, the base station may be used in the system shown in FIG. 1, to perform a function of the network device in the foregoing method embodiments. The base station 60 may include one or more DUs 601 and one or more CUs 602. The CU 602 may communicate with an NG core (next generation core, NC). The DU 601 may include at least one antenna 6011, at least one radio frequency unit 6012, at least one processor 6013, and at least one memory 6014. The DU 601 is mainly configured to receive/send a radio frequency signal, perform conversion between the radio frequency signal and a baseband signal, and perform partial baseband processing. The CU 602 may include at least one processor 6022 and at least one memory 6021. The CU 602 and the DU 601 may communicate with each other through an interface. A control plane (Control plane) interface may be Fs-C, for example, F1-C, and a user plane (User Plane) interface may be Fs-U, for example, F1-U.

The CU 602 is mainly configured to perform baseband processing, control the base station, and the like. The DU 601 and the CU 602 may be physically disposed together, or may be physically disposed separately, namely, a distributed base station. The CU 602 is a control center of the base station, may also be referred to as a processing unit, and is mainly configured to complete a baseband processing function. For example, the CU 602 may be configured to control the base station to perform an operation procedure related to the network device in the foregoing method embodiments.

Baseband processing on the CU and the DU may be divided based on protocol layers of a wireless network. For example, functions of a packet data convergence protocol (packet data convergence protocol, PDCP) layer and a protocol layer above the PDCP layer are set in the CU. Functions of protocol layers below the PDCP, such as a radio link control (radio link control, RLC) layer and a media access control (media access control, MAC) layer, are set in the DU. For another example, the CU implements functions of a radio resource control (radio resource control, RRC) layer and a packet data convergence protocol (packet data convergence protocol, PDCP) layer. The DU implements functions of a radio link control (radio link control, RLC) layer, a media access control (media access control, MAC) layer, and a physical (physical, PHY) layer.

In addition, optionally, the base station 60 may include one or more radio frequency units (RU), one or more DUs, and one or more CUs. The DU may include at least one processor 6013 and at least one memory 6014. The RU may include at least one antenna 6011 and at least one radio frequency unit 6012. The CU may include at least one processor 6022 and at least one memory 6021.

In an example, the CU 602 may include one or more boards, and a plurality of boards may jointly support a radio access network (for example, a 5G network) of a single access standard, or may separately support radio access networks (such as an LTE network, a 5G network, or another network) of different access standards. The memory 6021 and the processor 6022 may serve the one or more boards. In other words, a memory and a processor may be disposed on each board, or the plurality of boards may share a same memory and a same processor. In addition, a necessary circuit may further be disposed on each board. The DU 601 may include one or more boards, and a plurality of boards may jointly support a radio access network (for example, a 5G network) of a single access standard, or may separately support radio access networks (such as an LTE network, a 5G network, or another network) of different access standards. The memory 6014 and the processor 6013 may serve the one or more boards. In other words, a memory and a processor may be disposed on each board, or the plurality of boards may share a same memory and a same processor. In addition, a necessary circuit may further be disposed on each board.

Figure 14:
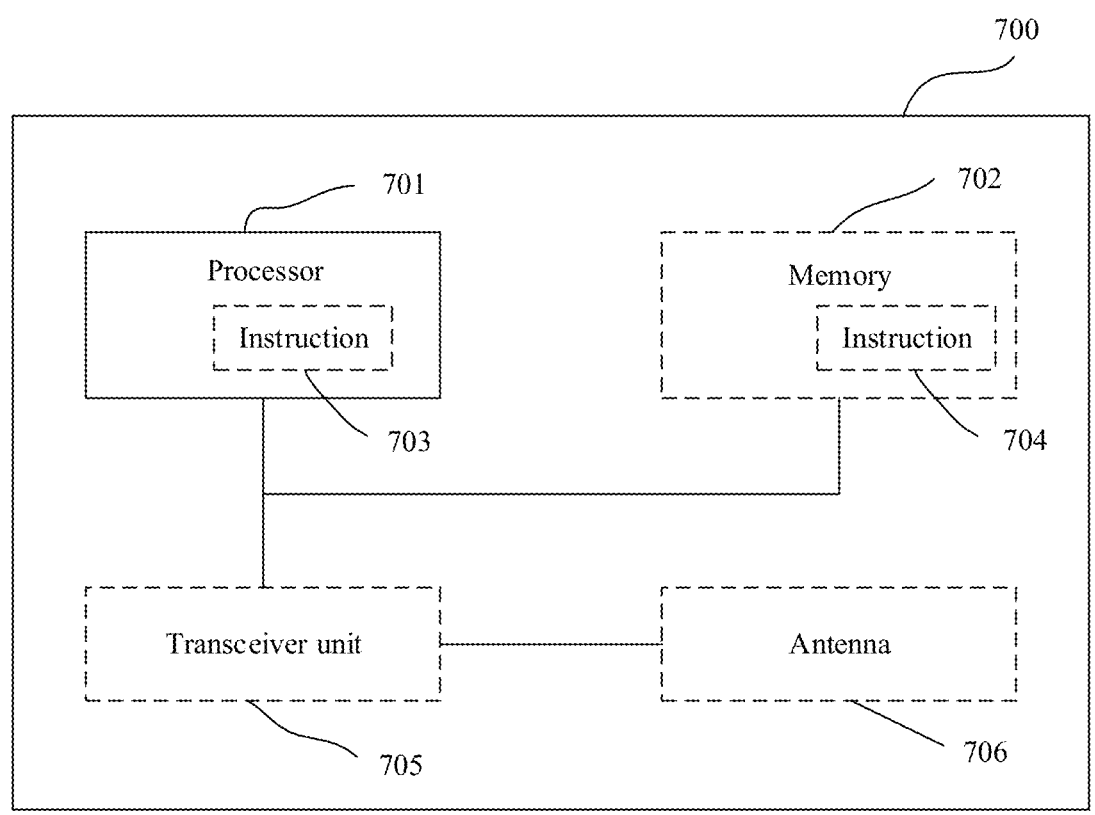
FIG. 14 is a diagram of a communications apparatus according to an embodiment of this application.

FIG. 14 is a diagram of a communications apparatus 700. The communications apparatus 700 may be configured to implement the methods described in the foregoing method embodiments. For details, refer to the descriptions in the foregoing method embodiments. The communications apparatus 700 may be a chip, a network device (for example, a base station), a terminal device, a core network device (for example, an AMF, or an AMF and an SMF), another network device, or the like.

The communications apparatus 700 includes one or more processors 701. The processor 701 may be a general-purpose processor, a special-purpose processor, or the like. For example, the processor 701 may be a baseband processor or a central processing unit. The baseband processor may be configured to process a communication protocol and communication data. The central processing unit may be configured to control the apparatus (for example, the base station, a terminal, the AMF, or the chip), execute a software program, and process data of the software program. The apparatus may include a transceiver unit configured to input (receive) and output (send) a signal. For example, the apparatus may be a chip, and the transceiver unit may be an input and/or output circuit or a communications interface of the chip. The chip may be used in the terminal device, the network device (for example, the base station), or the core network device. For another example, the apparatus may be the terminal device or the network device (for example, the base station), and the transceiver unit may be a transceiver, a radio frequency chip, or the like.

The communications apparatus 700 includes the one or more processors 701. The one or more processors 701 may implement the methods performed by the core network device, the network device, or the terminal device in the embodiment shown in FIGS. 4-11.

In a possible design, the communications apparatus 700 includes a means (means) configured to generate a first paging message or a second paging message, and a means (means) configured to send the first paging message or the second paging message. A function of the means configured to generate the first paging message or the second paging message and a function of the means configured to send the first paging message or the second paging message may be implemented by using the one or more processors. For example, the first paging message or the second paging message may be generated by using the one or more processors, and the first paging message or the second paging message is sent by using the transceiver, the input/output circuit, or an interface of the chip. For the first paging message or the second paging message, refer to the related descriptions in the foregoing method embodiments.

In a possible design, the communications apparatus 700 includes a means (means) configured to receive a first paging message or a second paging message, and a means (means) configured to determine a network or a network type associated with the first paging message or the second paging message. For the first paging message or the second paging message and how to determine the network or the network type associated with the first paging message or the second paging message, refer to the related descriptions in the foregoing method embodiments. For example, the first paging message or the second paging message may be received by using the transceiver, the input/output circuit, or an interface of the chip. The network or the network type associated with the first paging message or the second paging message is determined by using the one or more processors.

Optionally, in addition to implementing the methods in the embodiment shown in FIGS. 4-11, the processor 701 may implement another function.

Optionally, in a design, the processor 701 may further include an instruction 703. The instruction may be run on the processor, so that the communications apparatus 700 performs the methods described in the foregoing method embodiments.

In still another possible design, the communications apparatus 700 may further include a circuit. The circuit may implement a function of the network device or the terminal device in the foregoing method embodiments.

In still another possible design, the communications apparatus 700 may include one or more memories 702. The memory stores an instruction 704, and the instruction may be run on the processor, to enable the communications apparatus 700 to perform the methods described in the foregoing embodiments. Optionally, the memory may further store data. Optionally, the processor may also store an instruction and/or data. For example, the one or more memories 702 may store the mobile valid area described in the foregoing embodiments, or the related parameters, the tables, or the like in the foregoing embodiments. The processor and the memory may be separately disposed, or may be integrated together.

In still another possible design, the communications apparatus 700 may further include a transceiver unit 705 and an antenna 706, or include a communications interface. The transceiver unit 705 may be referred to as a transceiver, a transceiver circuit, or the like, and is configured to implement a transceiver function of the apparatus through the antenna 706. The communications interface (not shown in the figure) may be used for communication between a core network device and a network device, or communication between network devices. Optionally, the communications interface may be a wired communications interface, for example, an optical fiber communications interface.

The processor 701 may be referred to as a processing unit, and controls the apparatus (for example, the terminal, the base station, or the AMF).

This application further provides a communications system, including one or a combination of the foregoing one or more network devices, one or more terminal devices, and a core network device.

It should be understood that, the processor in the embodiments of this application may be a central processing unit (CPU), or may further be another general-purpose processor, a digital signal processor (DSP), an application-specific integrated circuit (ASIC), a field programmable gate array (FPGA), or another programmable logical device, discrete gate or transistor logical device, discrete hardware component, or the like. The general-purpose processor may be a microprocessor, or the processor may be any conventional processor or the like.

It may be understood that the memory in the embodiments of this application may be a volatile memory or a nonvolatile memory, or may include a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), used as an external cache. Through example but not limitative description, many forms of random access memories (random access memory, RAM) may be used, for example, a static random access memory (static RAM, SRAM), a dynamic random access memory (dynamic random access memory, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus random access memory (direct rambus RAM, DR RAM).

All or some of the foregoing embodiments may be implemented by using software, hardware (for example, a circuit), firmware, or any combination thereof. When software is used to implement the embodiments, the foregoing embodiments may be implemented entirely or partially in a form of a computer program product. The computer program product includes one or more computer instructions or computer programs. When the program instructions or the computer programs are loaded and executed on a computer, the procedures or the functions according to the embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

It should be understood that the term "and/or" in this specification describes only an association relationship for describing associated objects and represents that three relationships may exist. For example, A and/or B may represent the following three cases: only A exists, both A and B exist, and only B exists. A and B may be singular or plural. In addition, the character "/" in this specification usually represents an "or" relationship between the associated objects, or may represent an "and/or" relationship. A meaning depends on a context.

In this application, "at least one" means one or more, and "a plurality of" means two or more. "At least one item (piece) of the following" or a similar expression thereof means any combination of these items, including a singular item (piece) or any combination of plural items (pieces). For example, at least one item (piece) of a, b, or c may represent: a, b, c, a and b, a and c, b and c, or a, b, and c, where a, b, and c may be singular or plural.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, communications apparatus, and method may be implemented in other manners. For example, the described apparatus embodiment is merely an example. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, for example, a USB flash drive, a removable hard disk, a read-only memory (Read-Only Memory, ROM), a random access memory (Random Access Memory, RAM), a magnetic disk, or an optical disc.

The foregoing descriptions are merely implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
receiving, by a first network device, a first paging message, the first paging message being from a core network device when a paged first terminal device is in an idle state or being from a second network device when the paged first terminal device is in an inactive state, the first paging message being used to page the first terminal device, the first paging message comprising seventh information, the seventh information being related to a second network associated with the first paging message, the seventh information indicating a network identifier of the second network associated with the first paging message;
wherein the first network device is configured to work for a first network, the first network being of a first network type and the second network being of a second network type;
wherein the first network type is a public network and the second network type is a non-public network, or the first network type is a non-public network and the second network type is a public network.

2. The method according to claim 1, further comprising:
sending, by the first network device, a second paging message used to page the first terminal device, wherein the second paging message is sent in the first network.

3. The method according to claim 2, wherein:
the second paging message comprises first information, and the first information is related to the second network associated with the second paging message.

4. The method according to claim 1, further comprising:
sending, by the first network device, second information in the first network, the second information indicating that the first network has a capability of supporting a service of the second network; and receiving a response message to the second paging message using the first network.

5. The method according to claim 4, wherein the response message comprises third information, the third information indicating the second network is associated with the response message.

6. The method according to claim 1, further comprising:
receiving, by the first network device, fourth information from the first terminal device, the fourth information requesting a change in a serving cell, and the first network does not have a capability of supporting a service of the second network.

7. The method according to claim 1, wherein the first paging message further comprises a first terminal device identifier of the first terminal device, and the first terminal device identifier is valid in both the first network and in the second network.

8. The method according to claim 1, wherein that the seventh information being related to the second network associated with the first paging message comprises:
the seventh information comprises a second network identifier of the first terminal device in the second network, and a first network identifier of the first terminal device in the first network is different from the second network identifier of the first terminal device in the second network.

9. The method according to claim 1, wherein the seventh information being related to the second network associated with the first paging message comprises:
the first paging message is included in a paging message used to page one or more terminal devices, the paging message comprising a first paging list and a second paging list, the first paging list carrying at least one terminal device identifier of the one or more terminal devices and the first paging list is associated with the first network, and the second paging list carrying the at least one terminal device identifier of the one or more terminal devices and the second paging list is associated with the second network, and the seventh information is a first terminal device identifier of the first terminal device which is included in the second paging list.

10. A communications apparatus, comprising:
a communication interface configured to receive a first paging message from a core network device when a paged first terminal device is in an idle state or a second network device when the paged first terminal device is in an inactive state, the first paging message being used to page the first terminal device, the first paging message comprising seventh information, and the seventh information being related to a second network associated with the first paging message, the seventh information indicating a network identifier of the second network associated with the first paging message;

wherein the first network device is configured to work for a first network, the first network being of a first network type and the second network being of a second network type;

wherein the first network type is a public network and the second network type is a non-public network, or the first network type is a non-public network and the second network type is a public network.

11. The communications apparatus according to claim 10, wherein the communication interface is configured to send a second paging message in the first network based on the first paging message, the second paging message used to page the first terminal device.

12. The communications apparatus according to claim 11, wherein the second paging message comprises first information, wherein the first information is related to the second network associated with the second paging message.

13. The communications apparatus according to claim 10, wherein the communication interface is further configured to:
send second information in the first network, wherein the second information indicates that the first network has a capability of supporting a service of the second network; and
receive a response message for the second paging message using the first network.

14. The apparatus according to claim 10, wherein the first paging message further comprises a first terminal device identifier of the first terminal device, and the first terminal device identifier is valid in both the first network and in the second network.

15. The apparatus according to claim 10, wherein that the seventh information being related to the second network associated with the first paging message comprises:
the seventh information comprises a second network identifier of the first terminal device in the second network, and a first network identifier of the first terminal device in the first network is different from the second network identifier of the first terminal device in the second network.

16. The apparatus according to claim 10, wherein the seventh information being related to the second network associated with the first paging message comprises:
the first paging message is included in a paging message used to page one or more terminal devices, the paging message comprising a first paging list and a second paging list, the first paging list carrying at least one terminal device identifier of the one or more terminal devices and the first paging list is associated with the first network, and the second paging list carrying the at least one terminal device identifier of the one or more terminal devices and the second paging list is associated with the second network, and the seventh information is a first terminal device identifier of the first terminal device which is included in the second paging list.

* * * * *